US011709651B2

(12) United States Patent
Liu et al.

(10) Patent No.: US 11,709,651 B2
(45) Date of Patent: Jul. 25, 2023

(54) BLUETOOTH AUDIO BROADCASTING SYSTEM AND RELATED MULTI-MEMBER BLUETOOTH DEVICE SUPPORTING BLUETOOTH LOW ENERGY AUDIO BROADCASTING OPERATIONS AND CAPABLE OF SYNCHRONOUSLY ADJUSTING AUDIO VOLUME

(71) Applicant: Realtek Semiconductor Corp., Hsinchu (TW)

(72) Inventors: Yu Hsuan Liu, Hsinchu (TW); Yung Chieh Lin, Hsinchu (TW); Qing Gu, Suzhou (CN); Bi Wei, Suzhou (CN); Yi-Cheng Chen, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 17/553,474

(22) Filed: Dec. 16, 2021

(65) Prior Publication Data
US 2022/0197590 A1 Jun. 23, 2022

(30) Foreign Application Priority Data

Dec. 18, 2020 (CN) .......................... 202011510985.4
Nov. 19, 2021 (TW) ................................ 110143297

(51) Int. Cl.
*H03G 3/00* (2006.01)
*G06F 3/16* (2006.01)
(Continued)

(52) U.S. Cl.
CPC ........ *G06F 3/165* (2013.01); *H04M 1/72412* (2021.01); *H04R 3/00* (2013.01);
(Continued)

(58) Field of Classification Search
CPC .............. G06F 3/165; H04M 1/72412; H04M 2250/02; H04R 3/00; H04R 2420/07; H04R 2430/01
(Continued)

(56) References Cited

U.S. PATENT DOCUMENTS 11,184,721 B2 11/2021 Millington et al.
2015/0312858 A1 10/2015 Kerai
(Continued)

FOREIGN PATENT DOCUMENTS

CN 110351669 A 10/2019
WO WO 2020/107491 A1 6/2020

OTHER PUBLICATIONS

Taiwanese Office Action and Search Report for Taiwanese Application No. 110143295, dated Feb. 22, 2022, with English translation.
(Continued)

*Primary Examiner* — Ammar T Hamid
(74) *Attorney, Agent, or Firm* — Birch, Stewart, Kolasch & Birch, LLP

(57) ABSTRACT

A Bluetooth audio broadcasting system includes: an audio broadcasting device, a first Bluetooth member device, and a second Bluetooth member device. The audio broadcasting device broadcasts BLE audio packets. After the first Bluetooth member device issues a volume adjusting request, the audio broadcasting device transmits a volume adjusting instruction to the first Bluetooth member device and the second Bluetooth member device. The first Bluetooth member device acquires a predetermined audio data from the BLE audio packets, controls a first audio playback circuit to playback the predetermined audio data, and adjusts an audio volume of the first audio playback circuit according to the volume adjusting instruction. The second Bluetooth member
(Continued)

device acquires the predetermined audio data from the BLE audio packets, controls a second audio playback circuit to playback the predetermined audio data, and adjusts an audio volume of the second audio playback circuit according to the volume adjusting instruction.

8 Claims, 13 Drawing Sheets

(51) Int. Cl.
*H04R 3/00* (2006.01)
*H04M 1/72412* (2021.01)

(52) U.S. Cl.
CPC ..... *H04M 2250/02* (2013.01); *H04R 2420/07* (2013.01); *H04R 2430/01* (2013.01)

(58) Field of Classification Search
USPC .................................................. 381/105, 104
See application file for complete search history.

(56) References Cited

U.S. PATENT DOCUMENTS

2017/0078836 A1* 3/2017 Song ..................... H04W 8/005
2017/0251295 A1 8/2017 Pergament et al.
2020/0280800 A1* 9/2020 Wilberding ............. G06F 3/041

OTHER PUBLICATIONS

Taiwanese Office Action and Search Report for Taiwanese Application No. 110143296, dated Feb. 22, 2022, with English translation.
Taiwanese Office Action and Search Report for Taiwanese Application No. 110143297, dated Feb. 22, 2022, with English translation.
Taiwanese Office Action and Search Report for Taiwanese Application No. 110143298, dated Feb. 22, 2022, with English translation.
Taiwanese Notice of Allowance for Taiwanese Application No. 110143297, dated Dec. 2, 2022, with English translation.
U.S. Office Action for U.S. Appl. No. 17/552,878, dated Feb. 10, 2023.
U.S. Office Action for U.S. Appl. No. 17/553,055, dated May 22, 2023.

* cited by examiner

BLUETOOTH AUDIO BROADCASTING SYSTEM AND RELATED MULTI-MEMBER BLUETOOTH DEVICE SUPPORTING BLUETOOTH LOW ENERGY AUDIO BROADCASTING OPERATIONS AND CAPABLE OF SYNCHRONOUSLY ADJUSTING AUDIO VOLUME

CROSS-REFERENCE TO RELATED APPLICATIONS

This application claims the benefit of priority to patent application No. 110143297, filed in Taiwan on Nov. 19, 2021; the entirety of which is incorporated herein by reference for all purposes.

This application claims the benefit of priority to Patent Application No. 202011510985.4, filed in China on Dec. 18, 2020; the entirety of which is incorporated herein by reference for all purposes.

BACKGROUND

The disclosure generally relates to Bluetooth Technologies and, more particularly, to a Bluetooth audio broadcasting system and a related multi-member Bluetooth device supporting Bluetooth Low Energy (BLE) audio broadcasting operations and capable of synchronously adjusting audio volume.

There are two categories of Bluetooth technologies: Classic Bluetooth/Legacy Bluetooth technology and BLE (Bluetooth Low Energy) technology. The BLE technology is incompatible (or not completely compatible) with the Classic Bluetooth/Legacy Bluetooth technology, but the two technologies can coexist in the same Bluetooth device or the same Bluetooth chip. In other words, a single Bluetooth device or a single Bluetooth chip may be designed to support both the BLE technology and the Classic Bluetooth/Legacy Bluetooth technology, or may be designed to support only one category of the Bluetooth communication standards.

The newly launched Bluetooth LE Audio (BLE Audio) technology (hereinafter referred to as the BLE Audio technology) based on Bluetooth Core Specification Version 5.2 is a significant update to the technical specifications of audio transmission over the past twenty years of development of Bluetooth technologies. The main advantage of the BLE Audio technology is that the BLE Audio technology can transmit audio with higher quality while significantly reducing power consumption. In addition, the BLE Audio technology also utilizes a new mechanism called Broadcast Isochronous Stream (BIS) to conduct audio broadcasting operations. Utilizing a multi-member Bluetooth device to receive and playback audio broadcasting contents adopting the BLE Audio technology is one of the main development directions of future Bluetooth-related applications. The aforementioned multi-member Bluetooth device refers to a Bluetooth device formed by multiple Bluetooth circuits cooperating with each other, such as, a pair of Bluetooth earphones, a group of Bluetooth speakers, or the like.

It is well known that the BLE Audio technology does not specify how to flexibly adjust the audio volume of the audio receiving terminal when conducting audio broadcasting by using BIS mechanism. Of course, the BLE Audio technology does not specify how to synchronously adjust the audio volume of different Bluetooth member devices in the multi-member Bluetooth device when conducting audio broadcasting by using BIS mechanism. It is predictable that certain problems may be occurred when realizing audio broadcasting with the BLE Audio technology. For example, an audio broadcasting with unpredictable audio volume may cause discomfort or displeasure to some users, and even some users may be frightened by receiving sudden and loud audio broadcasting. Moreover, different users have different sensitivity and tolerance to the audio volume, and thus a single audio volume configuration is apparently unable to meet the requirements of different users at the same time.

Therefore, when utilizing the multi-member Bluetooth device to receive and playback the audio broadcasting adopting the BLE Audio technology, if the audio volume of different Bluetooth member devices in the multi-member Bluetooth device cannot be flexibly and synchronously adjusted, it may severely hinder the development prospects of the BLE Audio technology in the audio broadcasting applications.

SUMMARY

An example embodiment of a Bluetooth audio broadcasting system is disclosed, comprising: an audio broadcasting device, arranged to operably broadcast one or more Bluetooth LE audio packets through a Broadcast Isochronous Stream logical transport; a first Bluetooth member device, comprising: a first Bluetooth communication circuit, arranged to operably receive the one or more BLE audio packets; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; and a second Bluetooth member device, comprising: a second Bluetooth communication circuit, arranged to operably receive the one or more BLE audio packets; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; wherein the audio broadcasting device is further arranged to operably transmit a predetermined volume instruction to the first Bluetooth member device and the second Bluetooth member device before broadcasting the one or more BLE audio packets; wherein the first Bluetooth communication circuit is further arranged to operably receive the predetermined volume instruction, and the first control circuit is further arranged to operably control the first audio processing circuit to configure an audio volume of the first audio playback circuit in advance according to the predetermined volume instruction; wherein the second Bluetooth communication circuit is further arranged to operably receive the predetermined volume instruction, and the second control circuit is further arranged to operably control the second audio processing circuit to configure an audio volume of the second audio playback circuit (123) in advance according to the predetermined volume instruction.

Another example embodiment of a multi-member Bluetooth device is disclosed, comprising: a first Bluetooth member device, comprising: a first Bluetooth communication circuit, arranged to operably receive one or more BLE audio packets broadcasted by an audio broadcasting device through a Broadcast Isochronous Stream logical transport; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; and a second Bluetooth member device, comprising: a second Bluetooth communication circuit, arranged to operably receive the one or more BLE audio packets broadcasted by the audio broadcasting device through the BIS logical transport; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; wherein, the first control circuit is further arranged to operably control the first Bluetooth member device to collaboratively form a coordinate set with the second Bluetooth member device, and the second control circuit is further arranged to operably control the second Bluetooth member device to collaboratively form the coordinate set with the first Bluetooth member device; wherein the audio broadcasting device transmits a predetermined volume instruction to the first Bluetooth member device and the second Bluetooth member device before broadcasting the one or more BLE audio packets; wherein the first Bluetooth communication circuit is further arranged to operably receive the predetermined volume instruction, and the first control circuit is further arranged to operably control the first audio processing circuit to configure an audio volume of the first audio playback circuit in advance according to the predetermined volume instruction; wherein the second Bluetooth communication circuit is further arranged to operably receive the predetermined volume instruction, and the second control circuit is further arranged to operably control the second audio processing circuit to configure an audio volume of the second audio playback circuit in advance according to the predetermined volume instruction.

Another example embodiment of a Bluetooth audio broadcasting system is disclosed, comprising: an audio broadcasting device, arranged to operably broadcast one or more Bluetooth LE audio packets through a Broadcast Isochronous Stream logical transport; a first Bluetooth member device, comprising: a first Bluetooth communication circuit, arranged to operably receive the one or more BLE audio packets; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; and a second Bluetooth member device, comprising: a second Bluetooth communication circuit, arranged to operably receive the one or more BLE audio packets; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; wherein after the first Bluetooth member device and the second Bluetooth member device receive the one or more BLE audio packets, the audio broadcasting device transmits a volume adjusting instruction to the first Bluetooth member device and the second Bluetooth member device in a situation where the audio broadcasting device receives a volume adjusting signal; wherein the first Bluetooth communication circuit is further arranged to operably receive the volume adjusting instruction, and the first control circuit is further arranged to operably control the first audio processing circuit to adjust an audio volume of the first audio playback circuit according to the volume adjusting instruction; wherein the second Bluetooth communication circuit is further arranged to operably receive the volume adjusting instruction, and the second control circuit is further arranged to operably control the second audio processing circuit to adjust an audio volume of the second audio playback circuit according to the volume adjusting instruction.

Another example embodiment of a multi-member Bluetooth device is disclosed, comprising: a first Bluetooth member device, comprising: a first Bluetooth communication circuit, arranged to operably receive one or more BLE audio packets broadcasted by an audio broadcasting device through a Broadcast Isochronous Stream logical transport; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; and a second Bluetooth member device, comprising: a second Bluetooth communication circuit, arranged to operably receive the one or more BLE audio packets broadcasted by the audio broadcasting device through the BIS logical transport; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; wherein the first control circuit is further arranged to operably control the first Bluetooth member device to collaboratively form a coordinate set with the second Bluetooth member device, and the second control circuit is further arranged to operably control the second Bluetooth member device to collaboratively form the coordinate set with the first Bluetooth member device; wherein after the first Bluetooth member device and the second Bluetooth member device receives the one or more BLE audio packets, the audio broadcasting device transmits a volume adjusting instruction to the first Bluetooth member device and the second Bluetooth member device in a situation where the audio broadcasting device receives a volume adjusting signal; wherein the first Bluetooth communication circuit is further arranged to operably receive the volume adjusting instruction, and the first control circuit is further arranged to operably control the first audio processing circuit to adjust an audio volume of the first audio playback circuit according to the volume adjusting instruction; wherein the second Bluetooth communication circuit is further arranged to operably receive the volume adjusting instruction, and the second control circuit is further arranged to operably control the second audio processing circuit to adjust an audio volume of the second audio playback circuit according to the volume adjusting instruction.

Another example embodiment of a Bluetooth audio broadcasting system is disclosed, comprising: an audio broadcasting device, arranged to operably broadcast one or more Bluetooth LE audio packets through a Broadcast Isochronous Stream logical transport; a first Bluetooth member device, comprising: a first Bluetooth communication circuit, arranged to operably receive the one or more BLE audio packets; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; a second Bluetooth member device, comprising: a second Bluetooth communication circuit, arranged to operably receive the one or more BLE audio packets; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; wherein the audio broadcasting device transmits a volume adjusting instruction to the first Bluetooth member device and the second Bluetooth member device after a volume adjustment request is issued from the first Bluetooth member device; wherein the first Bluetooth communication circuit is further arranged to operably receive the volume adjusting instruction, and the first control circuit is further arranged to operably control the first audio processing circuit to adjust an audio volume of the first audio playback circuit according to the volume adjusting instruction; wherein the second Bluetooth communication circuit is further arranged to operably receive the volume adjusting instruction, and the second control circuit is further arranged to operably control the second audio processing circuit to adjust an audio volume of the second audio playback circuit according to the volume adjusting instruction.

Another example embodiment of a multi-member Bluetooth device is disclosed, comprising: a first Bluetooth member device, comprising: a first Bluetooth communication circuit, arranged to operably receive one or more BLE audio packets broadcasted by an audio broadcasting device through a Broadcast Isochronous Stream logical transport; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; and a second Bluetooth member device, comprising: a second Bluetooth communication circuit, arranged to operably receive the one or more BLE audio packets broadcasted by the audio broadcasting device through the BIS logical transport; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; wherein the audio broadcasting device transmits a volume adjusting instruction to the first Bluetooth member device and the second Bluetooth member device after a volume adjustment request is issued from the first Bluetooth member device; wherein the first Bluetooth communication circuit is further arranged to operably receive the volume adjusting instruction, and the first control circuit is further arranged to operably control the first audio processing circuit to adjust an audio volume of the first audio playback circuit according to the volume adjusting instruction; wherein the second Bluetooth communication circuit is further arranged to operably receive the volume adjusting instruction, and the second control circuit is further arranged to operably control the second audio processing circuit to adjust an audio volume of the second audio playback circuit according to the volume adjusting instruction.

Another example embodiment of a Bluetooth audio broadcasting system is disclosed, comprising: an audio broadcasting device, arranged to operably broadcast one or more Bluetooth LE audio packets through a Broadcast Isochronous Stream logical transport; a first Bluetooth member device, comprising: a first Bluetooth communication circuit, arranged to operably receive the one or more BLE audio packets; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; and a second Bluetooth member device, comprising: a second Bluetooth communication circuit, arranged to operably receive the one or more BLE audio packets; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; wherein the first audio processing circuit is further arranged to operably adjust an audio volume of the first audio playback circuit according to a volume adjusting instruction transmitted from another device other than the audio broadcasting device after the first Bluetooth communication circuit receives the one or more BLE audio packets; wherein the second audio processing circuit is further arranged to operably adjust an audio volume of the second audio playback circuit according to the volume adjusting instruction after the second Bluetooth communication circuit receives the one or more BLE audio packets.

Another example embodiment of a multi-member Bluetooth device is disclosed, comprising: a first Bluetooth member device, comprising: a first Bluetooth communication circuit, arranged to operably receive one or more BLE audio packets broadcasted by an audio broadcasting device through a Broadcast Isochronous Stream logical transport; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; and a second Bluetooth member device, comprising: a second Bluetooth communication circuit, arranged to operably receive the one or more BLE audio packets broadcasted by the audio broadcasting device through the BIS logical transport; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; wherein the first control circuit is further arranged to operably control the first audio processing circuit to adjust an audio volume of the first audio playback circuit according to a volume adjusting instruction transmitted from another device other than the audio broadcasting device after the first Bluetooth communication circuit receives the one or more BLE audio packets; wherein the second control circuit is further arranged to operably control the second audio processing circuit to adjust an audio volume of the second audio playback circuit according to the volume adjusting instruction after the second Bluetooth communication circuit receives the one or more BLE audio packets.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
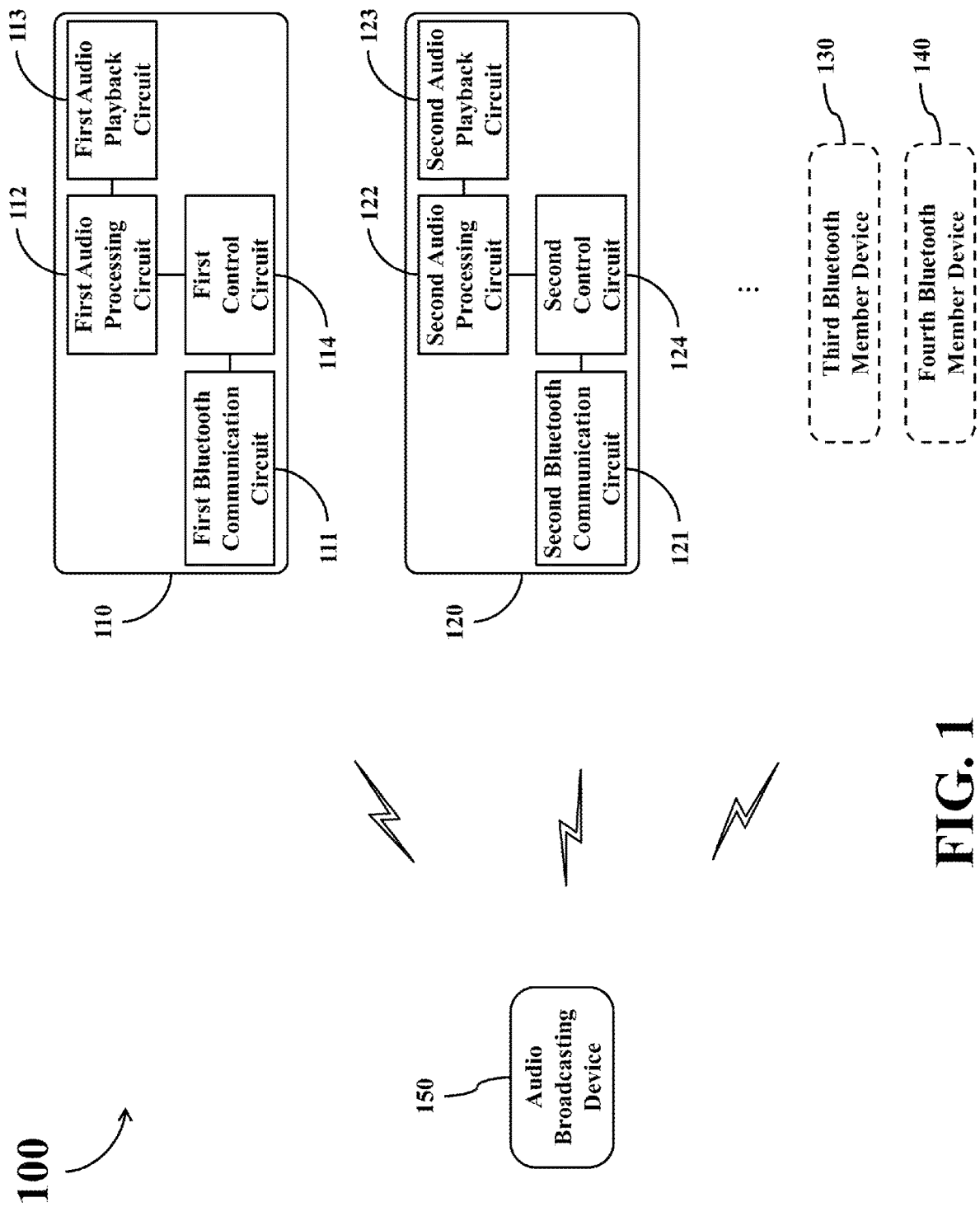
FIG. 1 shows a simplified functional block diagram of a Bluetooth audio broadcasting system according to a first embodiment of the present disclosure.

FIG. 1 shows a simplified functional block diagram of a Bluetooth audio broadcasting system 100 according to a first embodiment of the present disclosure. The Bluetooth audio broadcasting system 100 comprises multiple Bluetooth member devices capable of receiving audio broadcasting and an audio broadcasting device 150 for broadcasting audio data. The audio broadcasting device 150 is arranged to operably adopt Bluetooth LE Audio (BLE Audio) technology (hereinafter referred to as BLE Audio technology) specified by the Bluetooth Core Specification Version 5.2 or newer versions to broadcast audio data of various contents. For example, the aforementioned audio data may be flight information in the airport, schedule reminders in the train station or the high-speed rail station, story sounds in the movie theater, voice information in the gymnasium, guiding voice in the museum, introduction voice in the exhibition, voice translation in the auditorium, music or voice data selected by the user, multi-channel audio provided by the TV, contents of the teacher in the classroom, other types of audio content, or the like.

Each of the multiple Bluetooth member devices in the Bluetooth audio broadcasting system 100 supports the BLE technology specified by the Bluetooth Core Specification Version 5.2 or newer versions, and can receive and playback the audio data broadcasted by the audio broadcasting device 150. In practice, the Bluetooth audio broadcasting system 100 may comprises two or more than two Bluetooth member devices. For the convenience of description, only four exemplary Bluetooth member devices are illustrated in the embodiment of FIG. 1, which respectively are a first Bluetooth member device 110, a second Bluetooth member device, 120, a third Bluetooth member device 130, and a fourth Bluetooth member device 140.

In practical applications, the aforementioned first Bluetooth member device 110, second Bluetooth member device 120, third Bluetooth member device 130, and fourth Bluetooth member device 140 may collectively form a multi-member Bluetooth device, such as a group of multi-channel Bluetooth speakers. In this situation, the first Bluetooth member device 110, the second Bluetooth member device 120, the third Bluetooth member device 130, and the fourth Bluetooth member device 140 may adopt various approaches complying with the Bluetooth communication standard to establish a Bluetooth piconet, and may transmit various commands or data through the Bluetooth piconet. Alternatively, the first Bluetooth member device 110, the second Bluetooth member device 120, the third Bluetooth member device 130, and the fourth Bluetooth member device 140 may collectively form a coordinate set complying with various Bluetooth communication standards.

Alternatively, the aforementioned first Bluetooth member device 110, second Bluetooth member device 120, third Bluetooth member device 130, and fourth Bluetooth member device 140 may respectively belong to different multi-member Bluetooth devices. For example, the aforementioned first Bluetooth member device 110 and second Bluetooth member device 120 may collectively form a first multi-member Bluetooth device (e.g., a pair of Bluetooth earphones), and the aforementioned third Bluetooth member device 130 and fourth Bluetooth member device 140 may collectively form a second multi-member Bluetooth device (e.g., another pair of Bluetooth earphones). In this situation, the first Bluetooth member device 110 and the second Bluetooth member device 120 may adopt various approaches complying with the Bluetooth communication standard to establish a first Bluetooth piconet, and may transmit various commands or data through the first Bluetooth piconet. On the other hand, the third Bluetooth member device 130 and the fourth Bluetooth member device 140 may adopt various approaches complying with the Bluetooth communication standard to establish a second Bluetooth piconet, and may transmit various commands or data through the second Bluetooth piconet. Alternatively, the first Bluetooth member device 110 and the second Bluetooth member device 120 may collectively form a first coordinate set complying with various Bluetooth communication standards, and the third Bluetooth member device 130 and the fourth Bluetooth member device 140 may collectively form a second coordinate set complying with various Bluetooth communication standards.

In the embodiment of FIG. 1, the first Bluetooth member device 110 comprises a first Bluetooth communication circuit 111, a first audio processing circuit 112, a first audio playback circuit 113, and a first control circuit 114. Similarly, the second Bluetooth member device 120 comprises a second Bluetooth communication circuit 121, a second audio processing circuit 122, a second audio playback circuit 123, and a second control circuit 124.

In the first Bluetooth member device 110, the first Bluetooth communication circuit 111 is arranged to operably conduct Bluetooth communication to receive the audio data broadcasted by the audio broadcasting device 150 by adopting the BLE Audio technology. The first audio processing circuit 112 is coupled with the first audio playback circuit 113, and arranged to operably process the audio data transmitted from the audio broadcasting device 150 (e.g., encoding or decoding the audio data and/or conducting data format conversion) and to operably control the first audio playback circuit 113 to playback the audio data. The first control circuit 114 is coupled with the first Bluetooth communication circuit 111 and the first audio processing circuit 112, and arranged to operably parse the Bluetooth packets received by the first Bluetooth communication circuit 111 to acquire related information or commands and to operably control the operation of the first audio processing circuit 112.

In some embodiments, the first control circuit 114 is further arranged to operably control the first Bluetooth member device 110 to act as a Bluetooth Central in a Bluetooth piconet and to operably modify a clock signal utilized by the first Bluetooth member device 110, so as to synchronize a piconet clock shared by the first Bluetooth member device 110 and other Bluetooth devices.

The first control circuit 114 may communicate with other Bluetooth devices through the first Bluetooth communication circuit 111. The first control circuit 114 may further utilize the first audio processing circuit 112 to process the audio data transmitted from the audio broadcasting device 150 and may instruct the first audio processing circuit 112 to control the first audio playback circuit 113 to playback the audio data.

In the second Bluetooth member device 120, the second Bluetooth communication circuit 121 is arranged to operably conduct Bluetooth communication to receive the audio data broadcasted by the audio broadcasting device 150 by adopting the BLE Audio technology. The second audio processing circuit 122 is coupled with the second audio playback circuit 123, and arranged to operably process the audio data transmitted from the audio broadcasting device 150 (e.g., encoding or decoding the audio data and/or conducting data format conversion) and to operably control the second audio playback circuit 123 to playback the audio data. The second control circuit 124 is coupled with the second Bluetooth communication circuit 121 and the second audio processing circuit 122, and arranged to operably parse the Bluetooth packets received by the second Bluetooth communication circuit 121 to acquire related information or commands and to operably control the operation of the second audio processing circuit 122. In addition, the second control circuit 124 is further arranged to operably modify a clock signal utilized by the second Bluetooth member device 120, so as to synchronize a piconet clock shared by the second Bluetooth member device 120 and other Bluetooth devices.

In this embodiment, the second control circuit 124 is further arranged to operably control the second Bluetooth member device 120 to act as a Bluetooth Peripheral in the aforementioned Bluetooth piconet and to operably modify the clock signal utilized by the second Bluetooth member device 120, so as to synchronize the piconet clock shared by the second Bluetooth member device 120 and the first Bluetooth member device 110.

The second control circuit 124 may communicate with other Bluetooth devices through the second Bluetooth communication circuit 121. The second control circuit 124 may also utilize the second audio processing circuit 122 to process the audio data transmitted from the audio broadcasting device 150 and may instruct the second audio processing circuit 122 to control the second audio playback circuit 123 to playback the audio data.

In practice, the aforementioned first Bluetooth communication circuit 111 and second Bluetooth communication circuit 121 may be realized with appropriate Bluetooth transmission circuits supporting the Bluetooth communication protocol of the Bluetooth Core Specification Version 5.2 or a newer version. The first audio processing circuit 112 and the second audio processing circuit 122 may be realized with digital computing circuits, microprocessors, Application Specific Integrated Circuits (ASICs), or digital-to-analog converters (DACs) capable of conducting various encoding/decoding processing and/or data format conversion on the audio data. The first audio playback circuit 113 and the second audio playback circuit 123 may be realized with various appropriate circuits capable of receiving and playbacking the audio data, such as various types of speakers. The first control circuit 114 and the second control circuit 124 may be realized with various packet processing circuits, digital computing circuits, microprocessors, or ASICs having appropriate computing ability and capable of parsing and generating Bluetooth packets.

In some embodiments, the aforementioned first Bluetooth communication circuit 111 and second Bluetooth communication circuit 121 may be realized with appropriate Bluetooth transmission circuits that also support the Bluetooth communication protocol of earlier Bluetooth versions (e.g., Bluetooth 2.0, Bluetooth 3.0, Bluetooth 4.0, Bluetooth 4.2, or the like). In this situation, the aforementioned first control circuit 114 and second control circuit 124 should be designed to be able to parse and generate Bluetooth packets defined by the Bluetooth communication protocol of earlier Bluetooth versions.

Furthermore, different functional blocks of the aforementioned first Bluetooth member device 110 may be realized with separate circuits or may be integrated into a single Bluetooth controller IC or a single wearable Bluetooth device (e.g., a Bluetooth earphone). In addition, if necessary, the first Bluetooth communication circuit 111 may be coupled with additional antenna devices (not shown in the figures). Similarly, different functional blocks of the aforementioned second Bluetooth member device 120 may be realized with separate circuits or may be integrated into a single Bluetooth controller IC or a single wearable Bluetooth device (e.g., a Bluetooth earphone). In addition, if necessary, the second Bluetooth communication circuit 121 may be coupled with additional antenna devices (not shown in the figures).

In some embodiments, the aforementioned first audio processing circuit 112 and second audio processing circuit 122 may be respectively integrated into the aforementioned first control circuit 114 and the second control circuit 124.

In other words, the aforementioned first audio processing circuit 112 and first control circuit 114 may be realized with separate circuits or may be realized with a same circuit. Similarly, the aforementioned second audio processing circuit 122 and second control circuit 124 may be realized with separate circuits or may be realized with a same circuit.

The main circuit structure and implementation of other Bluetooth devices in the Bluetooth audio broadcasting system 100 are similar to the aforementioned first Bluetooth member device 110 or second Bluetooth member device 120, but different additional circuit components may be configured in different Bluetooth member devices, and the circuit structure of all Bluetooth member devices are not limited to be exactly identical.

As described previously, the audio broadcasting device 150 may adopt the BLE Audio technology specified by the Bluetooth Core Specification Version 5.2 or newer versions to broadcast various audio data. In operations, the audio broadcasting device 150 may broadcast one or more Bluetooth LE (BLE) audio packets containing audio data through a Broadcast Isochronous Stream (BIS) logical transport (hereinafter referred to as BIS logical transport).

In practice, the aforementioned audio broadcasting device 150 may be realized with various suitable circuits or devices that support the Bluetooth communication protocol of the Bluetooth Core Specification Version 5.2 or a newer version and capable of utilizing the BLE Audio technology to broadcast the audio data. For example, the audio broadcasting device 150 may be realized with an audio broadcast system, a voice guidance system, a voice broadcasting system, a desktop computer, a laptop computer, a tablet computer, a mobile communication device (e.g., a mobile phone), a wearable device, a vehicular audio system, a Bluetooth smart speaker, or the like.

However, the BLE Audio technology introduced by the Bluetooth Core Specification Version 5.2 does not specify how an audio source terminal adjusts the audio volume of the audio receiving terminals during the period at which audio source terminal conducts the audio broadcasting utilizing the BIS logical transport, nor does it require the audio source terminal to adjust the audio volume of the audio receiving terminals. Therefore, certain problems may be occurred when conducting audio broadcasting by adopting the BLE Audio technology. For example, an audio broadcasting with unpredictable audio volume may cause discomfort or displeasure to some users, and even some users may be frightened by receiving sudden and loud audio broadcasting.

In order to solve the blind spot of the existing BLE Audio technology of the Bluetooth Core Specification Version 5.2 in terms of audio broadcasting applications, the previously disclosed Bluetooth audio broadcasting system 100 adopts a special mechanism to broadcast the audio data.

Figure 2:
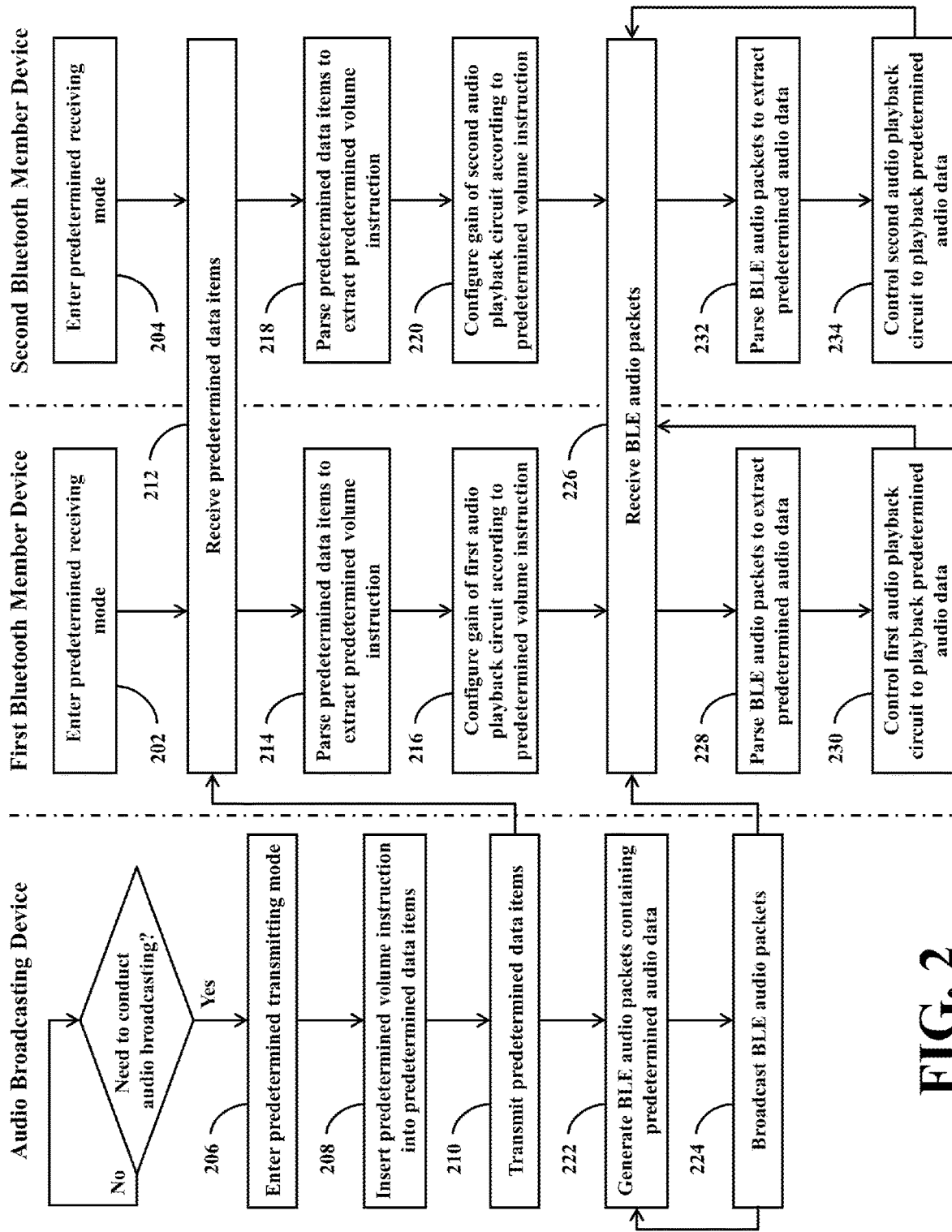
FIG. 2 shows a simplified flowchart of a method for conducting audio broadcasting by utilizing the BLE Audio technology according to a first embodiment of the present disclosure.

The operations of the Bluetooth audio broadcasting system 100 will be further described below by reference to FIG. 2. FIG. 2 shows a simplified flowchart of a method for conducting audio broadcasting by utilizing the BLE Audio technology according to a first embodiment of the present disclosure.

In the flowchart of FIG. 2, operations within a column under the name of a specific device are operations to be performed by the specific device. For example, operations within a column under the label "audio broadcasting device" are operations to be performed by the audio broadcasting device 150; operations within a column under the label "first Bluetooth member device" are operations to be performed by the first Bluetooth member device 110; operations within a column under the label "second Bluetooth member device" are operations to be performed by the second Bluetooth member device 120. The same analogous arrangement also applies to the subsequent flowcharts.

When the user wants to utilize the first Bluetooth member device 110 and the second Bluetooth member device 120 to receive an audio broadcasting, the first Bluetooth member device 110 may perform the operation 202 of FIG. 2, and the second Bluetooth member device 120 may perform operation 204 of FIG. 2.

In the operation 202, the first control circuit 114 may control the first Bluetooth communication circuit 111 to enter a predetermined receiving mode.

In the operation 204, the second control circuit 124 may control the second Bluetooth communication circuit 121 to enter the aforementioned predetermined receiving mode.

The aforementioned predetermined receiving mode refers to various operation modes capable of receiving various Bluetooth advertising packets, various BIS protocol data units (PDUs) (hereinafter referred to as BIS PDUs), and/or various Broadcast Isochronous Group (BIG) protocol data units (hereinafter referred to as BIG PDUs).

For example, the aforementioned predetermined receiving mode may be a LE Extended Passive Scan mode, a LE Extended Active Scan mode, a LE Extended Initiator mode, or a Periodic Scanning mode capable of receiving various Bluetooth advertising packets. For another example, the aforementioned predetermined receiving mode may be an operation mode capable of receiving various PDUs through the BIS logical transport and/or receiving various PDUs through a Broadcast Isochronous Group logical transport (hereinafter referred to as BIG logical transport), such as a Periodic Synchronization mode, a BIG Synchronization mode, or the like. Alternatively, the aforementioned predetermined receiving mode may be a combination of the aforementioned various operation modes.

As shown in FIG. 2, when the audio broadcasting device 150 needs to conduct the audio broadcasting, the audio broadcasting device 150 may perform operation 206 of FIG. 2.

In the operation 206, the audio broadcasting device 150 may enter a predetermined transmitting mode. The aforementioned predetermined transmitting mode refers to various operation modes capable of transmitting various Bluetooth advertising packets, various BIS PDUs, and/or various BIG PDUs.

For example, the aforementioned predetermined transmitting mode may be an Advertising mode, a Scannable mode, a Connectable mode, a Non-connectable mode, a Non-Scannable mode, a Periodic Advertising mode, a LE Extended Advertising mode, or a LE Periodic Advertising mode. For another example, the aforementioned predetermined transmitting mode may be a Broadcast Isochronous Broadcasting mode or a Broadcast Isochronous Synchronization mode capable of transmitting various BIS PDUs through the BIS logical transport and/or transmitting various BIG PDUs through the BIG logical transport. Alternatively, the aforementioned predetermined transmitting mode may be a combination of the aforementioned various operation modes.

In operation 208, the audio broadcasting device 150 may insert a predetermined volume instruction corresponding to a predetermined volume into one or more predetermined data items. The audio broadcasting device 150 may configure the aforementioned predetermined volume to a volume that is comfortable and not too loud for most people (e.g., about 45~60 dB), and may utilize various suitable data formats, index values, or values to indicate the aforementioned predetermined volume. In operations, the audio broadcasting device 150 may insert the predetermined volume instruction into a single or multiple specific fields of a single predetermined data item, or may separately insert the predetermined volume instruction into the specific fields of multiple predetermined data items. In some embodiments, in addition to the predetermined volume instruction, the audio broadcasting device 150 may further insert a Bluetooth address of the audio broadcasting device 150 and/or an indication message indicating that the audio broadcasting device 150 is about to start the audio broadcasting into a single or multiple specific fields of a single predetermined data item. Alternatively, the audio broadcasting device 150 may further insert the above Bluetooth address and/or above indication message into specific fields of multiple predetermined data items.

For example, in some embodiments where the aforementioned predetermined data items are various Bluetooth advertising packets, the audio broadcasting device 150 may insert the aforementioned predetermined volume instruction, Bluetooth address of the audio broadcasting device 150, and/or indication message into a single or multiple specific fields of a single Bluetooth advertising packet. Alternatively, the audio broadcasting device 150 may insert the above predetermined volume instruction, the above Bluetooth address, and/or the above indication message into specific fields of multiple Bluetooth advertising packets.

For another example, in some embodiments where the aforementioned predetermined data items are various BIS PDUs or BIG PDUs, the audio broadcasting device 150 may insert the aforementioned predetermined volume instruction, Bluetooth address of the audio broadcasting device 150, and/or indication message into a single or multiple specific fields of a single BIS PDU or a single or multiple specific fields of a single BIG PDU, or may alternatively insert the above predetermined volume instruction, the above Bluetooth address, and/or the above indication message into specific fields of multiple BIS PDUs or multiple BIG PDUs. In practice, the aforementioned specific fields may be Event Counter fields, Sub-Event Counter fields, Payload Counter fields, or the like in the BIS PDUs or the BIG PDUs.

In operation 210, the audio broadcasting device 150 may transmit the aforementioned one or more predetermined data items under the predetermined transmitting mode, so that the first Bluetooth member device 110 and the second Bluetooth member device 120, and other Bluetooth devices (e.g., the aforementioned third Bluetooth member device 130 and fourth Bluetooth member device 140) within the Bluetooth signal transmission range of the audio broadcasting device 150 can receive the aforementioned one or more predetermined data items.

For example, in some embodiments where the aforementioned predetermined transmitting mode is the Scannable mode, the Connectable mode, the Non-connectable mode, or the Non-Scannable mode, the one or more predetermined data items indicated in the aforementioned operation 208 and operation 210 may be one or more auxiliary advertising indication (AUX_ADV_IND) packets. Alternatively, the one or more predetermined data items indicated in the aforementioned operation 208 and operation 210 may be a group of packets formed by one or more extended advertising indication (ADV_EXT_IND) packets and one or more auxiliary advertising indication (AUX_ADV_IND) packets.

In this situation, if the aforementioned predetermined receiving mode is the LE Extended Passive Scan mode, the LE Extended Active Scan mode, or the LE Extended Initiator mode, then the first Bluetooth communication circuit 111 and the second Bluetooth communication circuit 121 may perform the operation 212 to receive the one or more predetermined data items transmitted from the audio broadcasting device 150.

For another example, in some embodiments where the aforementioned predetermined transmitting mode is the Non-connectable mode or the Non-Scannable mode, the one or more predetermined data items indicated in the aforementioned operation 208 and operation 210 may be one or more auxiliary chain indication (AUX_CHAIN_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary chain indication (AUX_CHAIN_IND) packets.

In this situation, if the aforementioned predetermined receiving mode is the LE Extended Passive Scan mode or the LE Extended Active Scan mode, then the first Bluetooth communication circuit 111 and the second Bluetooth communication circuit 121 may perform the operation 212 to receive the one or more predetermined data items transmitted from the audio broadcasting device 150.

For yet another example, in some embodiments where the aforementioned predetermined transmitting mode is the Scannable mode, the one or more predetermined data items indicated in the aforementioned operation 208 and operation 210 may be one or more auxiliary scan response (AUX_SCAN_RSP) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary scan response (AUX_SCAN_RSP) packets. Alternatively, the one or more predetermined data items indicated in the aforementioned operation 208 and operation 210 may be a group of packets formed by one or more auxiliary scan response (AUX_SCAN_RSP) packets and one or more auxiliary chain indication (AUX_CHAIN_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, one or more auxiliary scan response (AUX_SCAN_RSP) packets, and one or more auxiliary chain indication (AUX_CHAIN_IND) packets.

In this situation, if the aforementioned predetermined receiving mode is the LE Extended Active Scan mode, then the first Bluetooth communication circuit 111 and the second Bluetooth communication circuit 121 may perform the operation 212 to receive the one or more predetermined data items transmitted from the audio broadcasting device 150.

For yet another example, in some embodiments where the aforementioned predetermined transmitting mode is the Non-connectable mode, the Non-Scannable mode, the Periodic Advertising mode, the LE Extended Advertising mode, or the LE Periodic Advertising mode, the one or more predetermined data items indicated in the aforementioned operation 208 and operation 210 may be one or more auxiliary synchronous indication (AUX_SYNC_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary synchronous indication (AUX_SYNC_IND) packets.

In this situation, if the aforementioned predetermined receiving mode is the Periodic Scanning mode, then the first Bluetooth communication circuit 111 and the second Bluetooth communication circuit 121 may perform the operation 212 to receive the one or more predetermined data items transmitted from the audio broadcasting device 150.

For yet another example, in some embodiments where the aforementioned predetermined transmitting mode is an advertising mode specified by the Bluetooth communication protocol of the Bluetooth Version 4.0, the one or more predetermined data items indicated in the aforementioned operation 208 and operation 210 may be one or more advertising indication (ADV_IND) packets, one or more non-connectable advertising indication (ADV_NONCONN_IND) packets, or one or more discoverable advertisement indication (ADV_DISCOVER_IND) packets. Alternatively, the one or more predetermined data items indicated in the aforementioned operation 208 and operation 210 may be a group of packets formed by one or more advertising indication (ADV_IND) packets and one or more non-connectable advertising indication (ADV_NONCONN_IND) packets. Alternatively, the one or more predetermined data items indicated in the aforementioned operation 208 and operation 210 may be a group of packets formed by one or more advertising indication (ADV_IND) packets and one or more discoverable advertisement indication (ADV_DISCOVER_IND) packets. Alternatively, the one or more predetermined data items indicated in the aforementioned operation 208 and operation 210 may be a group of packets formed by of one or more advertising indication (ADV_IND) packets, one or more non-connectable advertising indication (ADV_NONCONN_IND) packets, and one or more discoverable advertisement indication (ADV_DISCOVER_IND) packets.

In this situation, if the aforementioned predetermined receiving mode is a mode capable of receiving the aforementioned predetermined data items, then the first Bluetooth communication circuit 111 and the second Bluetooth communication circuit 121 may perform the operation 212 to receive the one or more predetermined data items transmitted from the audio broadcasting device 150.

For yet another example, in some embodiments where the aforementioned predetermined transmitting mode is the Broadcast Isochronous Broadcasting mode or the Broadcast Isochronous Synchronization mode, the one or more predetermined data items indicated in the aforementioned operation 208 and operation 210 may be one or more BIS PDUs. Alternatively, the one or more predetermined data items indicated in the aforementioned operation 208 and operation 210 may be one or more BIG PDUs. Alternatively, the one or more predetermined data items indicated in the aforementioned operation 208 and operation 210 may be a group of PDUs formed by one or more BIS PDUs and one or more BIG PDUs.

In this situation, if the aforementioned predetermined receiving mode is an operation mode capable of receiving various PDUs through the BIS logical transports and/or capable of receiving various PDUs through the BIG logical transports, then the first Bluetooth communication circuit 111 and the second Bluetooth communication circuit 121 may perform the operation 212 to receive the one or more predetermined data items transmitted from the audio broadcasting device 150.

Then, the first Bluetooth member device 110 performs the operation 214 and the operation 216, and the second Bluetooth member device 120 performs the operation 218 and the operation 220.

In the operation 214, the first control circuit 114 may parse the one or more predetermined data items received by the first Bluetooth communication circuit 111 to extract a predetermined volume instruction corresponding to a predetermined volume. In some embodiments, the first control circuit 114 may also extract a Bluetooth address of the audio broadcasting device 150 and/or an indication message indicating that the audio broadcasting device 150 is about to start the audio broadcasting from the one or more predetermined data items received by the first Bluetooth communication circuit 111.

In the operation 216, the first control circuit 114 may control the first audio processing circuit 112 to configure an audio volume of the first audio playback circuit 113 in advance according to the predetermined volume instruction. In operations, the first control circuit 114 may control the first audio processing circuit 112 to configure a gain of the first audio playback circuit 113 in advance according to the predetermined volume instruction, so as to configure the audio volume of the first audio playback circuit 113.

In the operation 218, the second control circuit 124 may parse the one or more predetermined data items received by the second Bluetooth communication circuit 121 to extract a predetermined volume instruction corresponding to a predetermined volume. In some embodiments, the second control circuit 124 may also extract a Bluetooth address of the audio broadcasting device 150 and/or an indication message indicating that the audio broadcasting device 150 is about to start the audio broadcasting from the one or more predetermined data items received by the second Bluetooth communication circuit 121.

In the operation 220, the second control circuit 124 may control the second audio processing circuit 122 to configure an audio volume of the second audio playback circuit 123 in advance according to the predetermined volume instruction. In operations, the second control circuit 124 may control the second audio processing circuit 122 to configure a gain of the second audio playback circuit 123 in advance according to the predetermined volume instruction, so as to configure the audio volume of the second audio playback circuit 123.

The predetermined volume instruction received by the first Bluetooth member device 110 and the second Bluetooth member device 120 corresponds to a predetermined volume configured by the audio broadcasting device 150. As described previously, the aforementioned predetermined volume is a volume that most people feel comfortable and not too loud, such as about 45~60 dB.

In the aforementioned operation 216, the first control circuit 114 may control the first audio processing circuit 112 to configure the gain of the first audio playback circuit 113 according to the predetermined volume instruction, so as to adjust the audio volume of the first audio playback circuit 113 to be close to or equal to the aforementioned predetermined volume in advance.

Similarly, in the aforementioned operation 220, the second control circuit 124 may control the second audio processing circuit 122 to configure the gain of the second audio playback circuit 123 according to the predetermined volume instruction, so as to adjust the audio volume of the second audio playback circuit 123 to be close to or equal to the aforementioned predetermined volume in advance.

In other words, in this embodiment, before playbacking the audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

In the operation 222, the audio broadcasting device 150 may generate one or more Bluetooth LE (BLE) audio packets containing a predetermined audio data. In operations, the audio broadcasting device 150 may utilize the Low Complexity Communication Codec (LC3) to encode the predetermined audio data and insert the encoded data into one or more BLE audio packets. In practice, the audio broadcasting device 150 may utilize other appropriate encoding approaches to encode the predetermined audio data.

In the operation 224, the audio broadcasting device 150 may broadcast one or more BLE audio packets containing the aforementioned predetermined audio data through one or more BIS logical transports. In operations, the audio broadcasting device 150 may operate based on the approaches specified by the BLE Audio technology to broadcast the BLE audio packet containing the predetermined audio data to other Bluetooth member devices.

In the operation 226, the first Bluetooth communication circuit 111 of the first Bluetooth member device 110 receives the one or more BLE audio packets transmitted from the audio broadcasting device 150 through the aforementioned one or more BIS logical transports, and the second Bluetooth communication circuit 121 of the second Bluetooth member device 120 receives the one or more BLE audio packets transmitted from the audio broadcasting device 150 through the aforementioned one or more BIS logical transports.

Then, the first Bluetooth member device 110 performs the operation 228 and the operation 230, and the second Bluetooth member device 120 performs the operation 232 and the operation 234.

In the operation 228, the first control circuit 114 may parse the one or more BLE audio packets received by the first Bluetooth communication circuit 111 to extract the predetermined audio data generated by the audio broadcasting device 150.

In the operation 230, the first control circuit 114 may instruct the first audio processing circuit 112 to control the first audio playback circuit 113 to playback the predetermined audio data.

In the operation 232, the second control circuit 124 may parse the one or more BLE audio packets received by the second Bluetooth communication circuit 121 to extract the predetermined audio data generated by the audio broadcasting device 150.

In the operation 234, the second control circuit 124 may instruct the second audio processing circuit 122 to control the second audio playback circuit 123 to playback the predetermined audio data.

Since the first Bluetooth member device 110 and the second Bluetooth member device 120 receive the BLE audio packet transmitted from the audio broadcasting device 150 through the BIS logical transports, when the first audio playback circuit 113 playbacks the predetermined audio data, the second audio playback circuit 123 synchronously playbacks the predetermined audio data. In other words, the operation 230 and the operation 234 are performed synchronously.

The audio broadcasting device 150 may repeatedly perform the operation 222 and the operation 224 to broadcast subsequent predetermined audio data. On the other hand, the first Bluetooth member device 110 may repeatedly perform the operation 226, the operation 228, and the operation 230 to receive and playback the subsequent predetermined audio data, and the second Bluetooth member device 120 may repeatedly perform the operation 226, the operation 232, and the operation 234 to receive and playback the subsequent predetermined audio data.

Similarly, other Bluetooth member devices in the Bluetooth audio broadcasting system 100 (e.g., the aforementioned third Bluetooth member device 130 and fourth Bluetooth member device 140) may receive the BLE audio packets broadcasted by the audio broadcasting device 150 and playback the predetermined audio data contained in the BLE audio packets according to the foregoing approaches adopted by the first Bluetooth member device 110 or the second Bluetooth member device 120.

As can be appreciated from the foregoing descriptions of FIG. 1 through FIG. 2, before beginning to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

In the aforementioned embodiment, the Bluetooth audio broadcasting system 100 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 100 not only reduces the power consumption of the first Bluetooth member device 110 and the second Bluetooth member device 120 to thereby extend the serving time of the first Bluetooth member device 110 and the second Bluetooth member device 120, but also effectively improves the overall audio quality of audio broadcasting.

Similarly, before beginning to playback the predetermined audio data transmitted from the audio broadcasting device 150, other Bluetooth member devices in the Bluetooth audio broadcasting system 100 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150.

As a result, when beginning to synchronously playback the predetermined audio data, the audio volume of other Bluetooth member devices in the Bluetooth audio broadcasting system 100 can make the user feel comfortable and will not cause discomfort or displeasure to the user.

Figure 3:
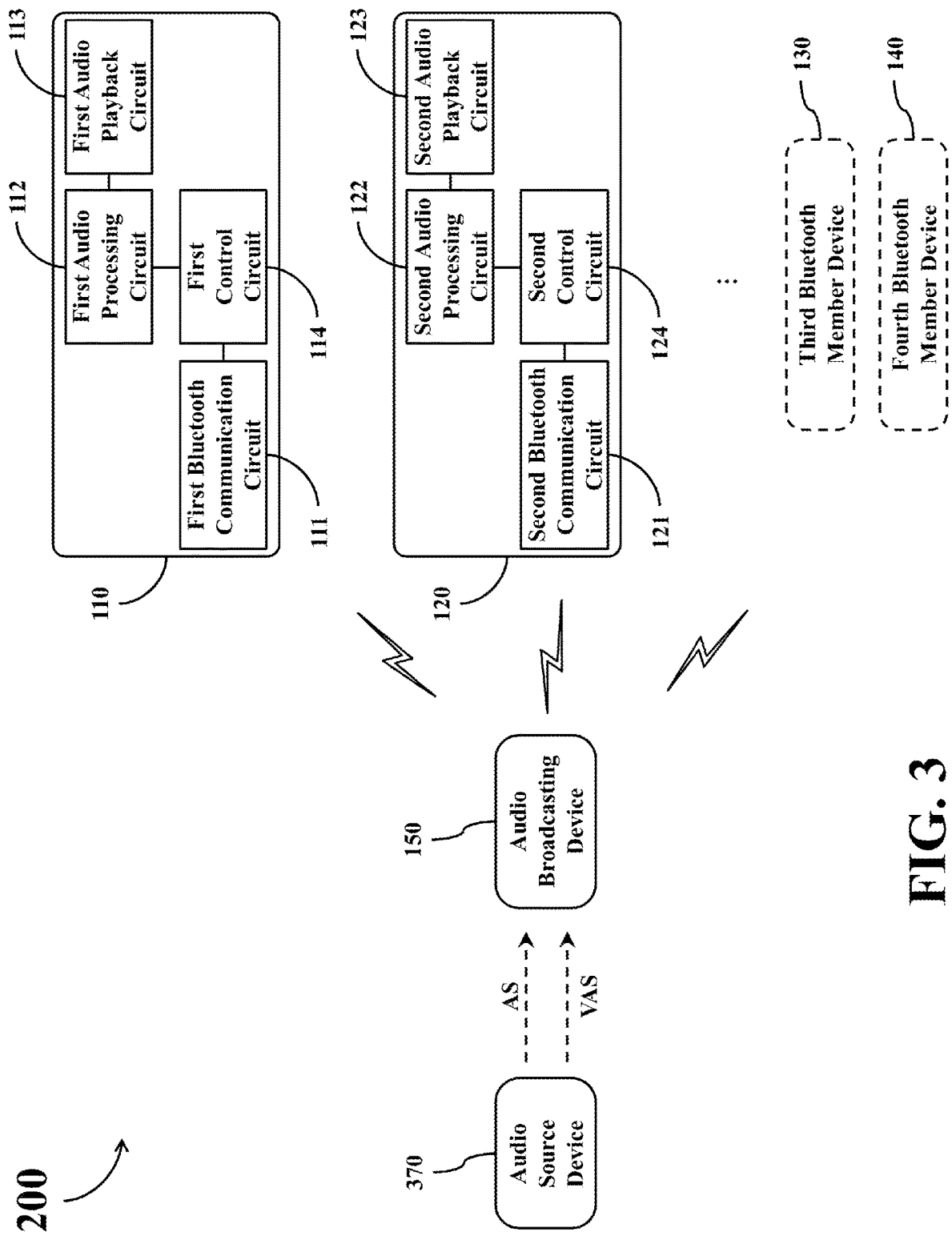
FIG. 3 shows a simplified functional block diagram of a Bluetooth audio broadcasting system according to a second embodiment of the present disclosure.

Please refer to FIG. 3, which shows a simplified functional block diagram of a Bluetooth audio broadcasting system 200 according to a second embodiment of the present disclosure. Similar to the Bluetooth audio broadcasting system 100 of FIG. 1, the Bluetooth audio broadcasting system 200 of FIG. 3 also comprises the audio broadcasting device 150 and multiple Bluetooth member devices (e.g., the aforementioned first Bluetooth member device 110, second Bluetooth member device 120, third Bluetooth member device 130, and fourth Bluetooth member device 140). In addition, the Bluetooth audio broadcasting system 200 further comprises an audio source device 370.

The audio source device 370 is arranged to operably receive the user's voice to generate a corresponding audio signal AS and to operably utilize various wired or wireless transmission approaches to transmit the audio signal AS to the audio broadcasting device 150. In the embodiment of FIG. 3, the audio broadcasting device 150 is further arranged to operably convert the audio signal AS transmitted from the audio source device 370 into the predetermined audio data to be broadcasted. In other words, in the embodiment of FIG. 3, the contents of the predetermined audio data broadcasted by the audio broadcasting device 150 are originated from the audio source device 370.

In operations, the audio broadcasting device 150 may adopt the BLE Audio technology specified by the Bluetooth Core Specification Version 5.2 or newer versions to broadcast the predetermined audio data. Similar to the embodiment of FIG. 1, the audio broadcasting device 150 may broadcast the BLE audio packets containing the predetermined audio data to multiple Bluetooth member devices in the Bluetooth audio broadcasting system 200 (e.g., the first Bluetooth member device 110, the second Bluetooth member device 120, the third Bluetooth member device 130, and the fourth Bluetooth member device 140 illustrated in FIG. 3) through the BIS logical transports.

Each Bluetooth member device in the Bluetooth audio broadcasting system 200 may receive and playback the predetermined audio data broadcasted by the audio broadcasting device 150 according to the approach of corresponding device in the embodiment of FIG. 1.

In the embodiment of FIG. 3, the audio source device 370 is further arranged to operably generate and transmit a volume adjusting signal VAS to the audio broadcasting device 150 according to the user's manipulation or command during the period at which the audio broadcasting device 150 conducts the audio broadcast. The audio broadcasting device 150 may generate a corresponding volume adjusting instruction according to the volume adjusting signal VAS generated by the audio source device 370, and may transmit the volume adjusting instruction to the first Bluetooth member device 110, the second Bluetooth member device 120, the third Bluetooth member device 130, and the fourth Bluetooth member device 140, so as to instruct the first Bluetooth member device 110, the second Bluetooth member device 120, the third Bluetooth member device 130, and the fourth Bluetooth member device 140 to adjust their audio volume.

In other words, the Bluetooth audio broadcasting system 200 may dynamically adjust the audio volume of the first Bluetooth member device 110, the second Bluetooth member device 120, the third Bluetooth member device 130, and the fourth Bluetooth member device 140 according to the user's manipulation or command during the audio broadcasting.

In practice, the aforementioned audio source device 370 may be realized with various appropriate circuits capable of receiving and converting voice into corresponding audio signal AS, capable of generating the volume adjusting signal VAS according to the user's manipulation or command, and supporting appropriate signal transmission approaches. For example, the audio source device 370 may be realized with a laptop computer, a tablet computer, a mobile communication device (e.g., a mobile phone), a wearable device, a video conference system, or various types of wireless microphones.

The foregoing descriptions regarding the implementations and connections of other circuits and devices in the Bluetooth audio broadcasting system 100 are also applicable to the Bluetooth audio broadcasting system 200 of FIG. 3. For the sake of brevity, the descriptions will not be repeated here.

Figure 4:
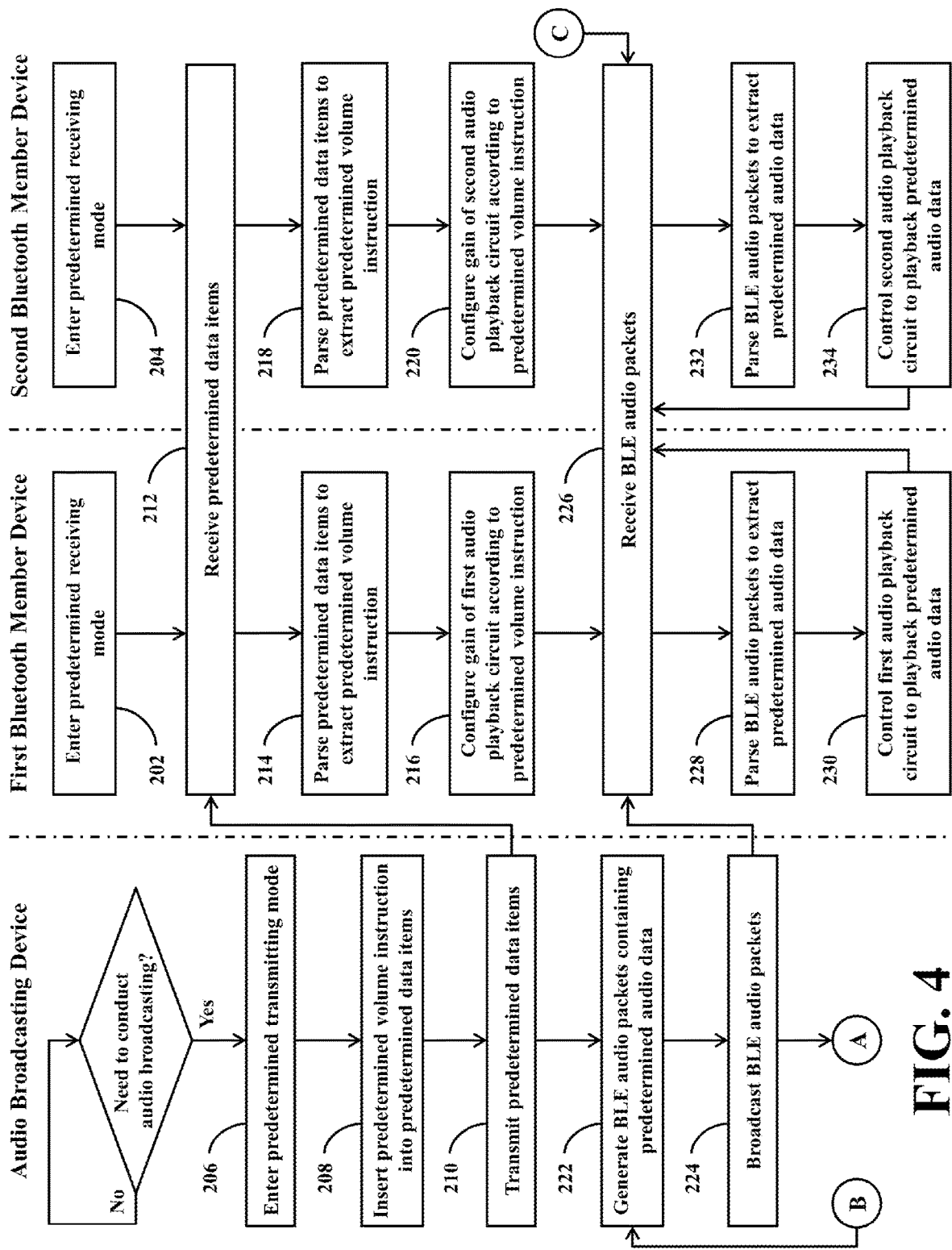
FIG. 4 through FIG. 5 collectively show a simplified flowchart of a method for conducting audio broadcasting by utilizing the BLE Audio technology according to a second embodiment of the present disclosure.
Figure 5:
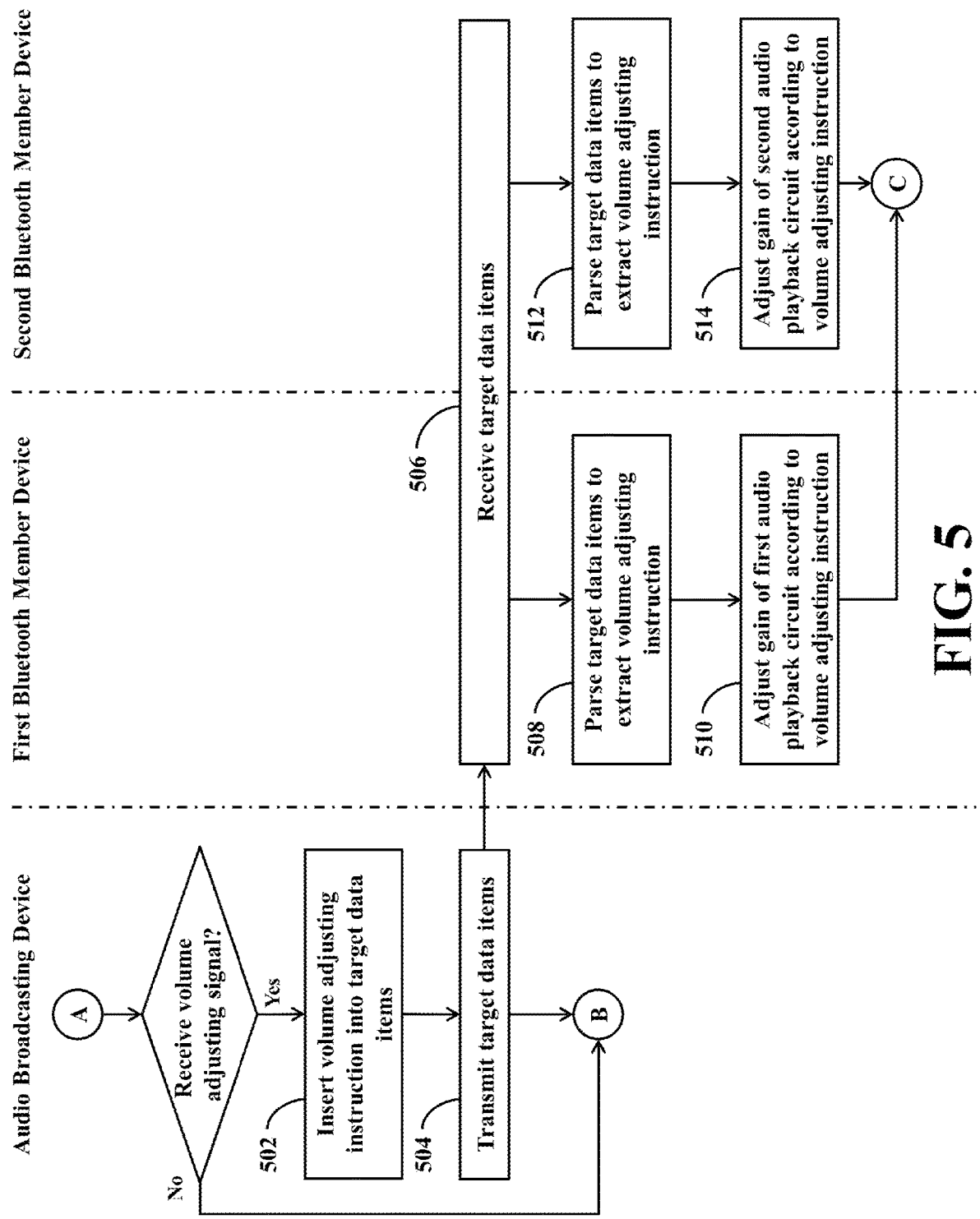

The operations of the Bluetooth audio broadcasting system 200 will be further described below by reference to FIG. 4 through FIG. 5. FIG. 4 through FIG. 5 collectively show a simplified flowchart of a method for conducting audio broadcasting by utilizing the BLE Audio technology according to a second embodiment of the present disclosure. In general, the operation 202 through the operation 234 of FIG. 4 are identical to the corresponding operations of the embodiment of FIG. 2.

For example, similar to the aforementioned embodiment of FIG. 2, when the user wants to utilize the first Bluetooth member device 110 and the second Bluetooth member device 120 in the Bluetooth audio broadcasting system 200 to receive the audio broadcasting, the first Bluetooth member device 110 may perform the operation 202 of FIG. 4, and the second Bluetooth member device 120 may perform the operation 204 of FIG. 4.

As described previously, the audio broadcasting device 150 in the embodiment of FIG. 3 may convert the audio signal AS transmitted from the audio source device 370 into the predetermined audio data to be broadcasted and then conduct the audio broadcasting. As shown in FIG. 4, when the audio broadcasting device 150 needs to conduct the audio broadcasting, the audio broadcasting device 150 may perform the operation 206 through the operation 210 of FIG. 4.

Then, the first Bluetooth member device 110 may perform the operation 212, the operation 214, and the operation 216 of FIG. 4, and the second Bluetooth member device 120 may perform the operation 212, the operation 218, and the operation 220 of FIG. 4.

After performing the operation 210, the audio broadcasting device 150 then performs the operation 222 and the operation 224 of FIG. 4. On the other hand, the first Bluetooth member device 110 may perform the operation 226, operation 228, and the operation 230 of FIG. 4, and the second Bluetooth member device 120 may perform the operation 226, operation 232, and the operation 234 of FIG. 4.

Similarly, the audio broadcasting device 150 may repeatedly perform the operation 222 and the operation 224 to broadcast the subsequent predetermined audio data. On the other hand, the first Bluetooth member device 110 may repeatedly perform the operation 226, operation 228, and the operation 230 to receive and playback the subsequent predetermined audio data, and the second Bluetooth member device 120 may repeatedly perform the operation 226, operation 232, and the operation 234 to receive and playback the subsequent predetermined audio data.

As described previously, the Bluetooth audio broadcasting system 200 may dynamically adjust the audio volume of multiple Bluetooth member devices in the Bluetooth audio broadcasting system 200 according to the user's manipulation or command during the audio broadcasting.

For example, during the period at which the audio broadcasting device 150 conducts the audio broadcasting (i.e., during the period at which the audio broadcasting device 150 repeatedly performs the operation 222 and the operation 224 of FIG. 4), if the user of the audio source device 370 wants to adjust the audio volume of the first Bluetooth member device 110, the second Bluetooth member device 120, the third Bluetooth member device 130, and the fourth Bluetooth member device 140, the user may conduct a specific manipulation or instruct a specific command to the audio source device 370, so as to render the audio source device 370 to generate a volume adjusting signal VAS and transmit the volume adjusting signal VAS to the audio broadcasting device 150.

As shown in FIG. 5, when receiving the volume adjusting signal VAS, the audio broadcasting device 150 may perform the operation 502 of FIG. 5.

In the operation 502, the audio broadcasting device 150 may insert a volume adjusting instruction for instructing a volume adjusting direction (e.g., turning up or turning down) into one or more target data items. In some embodiments, the aforementioned volume adjusting instruction may be further utilized to indicate a volume adjusting amount, such as 3%, 5%, 10%, 15%, 1 dB, 2 dB, 3 dB, 5 dB, or the like, in addition to instructing the volume adjusting direction. In operations, the audio broadcasting device 150 may insert the volume adjusting instruction into a single or multiple specific fields of a single target data item. Alternatively, the audio broadcasting device 150 may insert the above volume adjusting instruction into specific fields of multiple target data items.

For example, in some embodiments where the aforementioned target data items are various Bluetooth advertising packets, the audio broadcasting device 150 may insert the aforementioned volume adjusting instruction into a single or multiple specific fields of a single Bluetooth advertising packet. Alternatively, the audio broadcasting device 150 may insert the above volume adjusting instruction into specific fields of multiple Bluetooth advertising packets.

For another example, in some embodiments where the aforementioned target data items are various BIS PDUs or BIG PDUs, the audio broadcasting device 150 may insert the aforementioned volume adjusting instruction into a single or multiple specific fields of a single BIS PDU or a single or multiple specific fields of a single BIG PDU, or may alternatively insert the above volume adjusting instruction into specific fields of multiple BIS PDUs or multiple BIG PDUs. In practice, the aforementioned specific fields may be Event Counter fields, Sub-Event Counter fields, Payload Counter fields, or the like in the BIS PDUs or the BIG PDUs.

In the operation 504, the audio broadcasting device 150 may transmit the aforementioned one or more target data items under a target transmitting mode, so that the first Bluetooth member device 110 and the second Bluetooth member device 120 and other Bluetooth devices (e.g., the aforementioned third Bluetooth member device 130 and fourth Bluetooth member device 140) within the Bluetooth signal transmission range of the audio broadcasting device 150 can receive the aforementioned one or more target data items.

For example, in some embodiments where the aforementioned target transmitting mode is the Scannable mode, the Connectable mode, the Non-connectable mode, or the Non-Scannable mode, the one or more target data items indicated in the aforementioned operation 502 and operation 504 may be one or more auxiliary advertising indication (AUX_ADV_IND) packets. Alternatively, the one or more target data items indicated in the aforementioned operation 502 and operation 504 may be a group of packets formed by one or more extended advertising indication (ADV_EXT_IND) packets and one or more auxiliary advertising indication (AUX_ADV_IND) packets.

In this situation, if the first Bluetooth communication circuit 111 and the second Bluetooth communication circuit 121 operate in the LE Extended Passive Scan mode, the LE Extended Active Scan mode, or the LE Extended Initiator mode, then the first Bluetooth communication circuit 111 and the second Bluetooth communication circuit 121 may perform the operation 506 to receive the one or more target data items transmitted from the audio broadcasting device 150.

For another example, in some embodiments where the aforementioned target transmitting mode is the Non-connectable mode or the Non-Scannable mode, the one or more target data items indicated in the aforementioned operation 502 and operation 504 may be one or more auxiliary chain indication (AUX_CHAIN_IND) packets. Alternatively, the one or more target data items indicated in the aforementioned operation 502 and operation 504 may be a group of packets formed by one or more extended advertising indication (ADV_EXT_IND) packets, one or more auxiliary advertising indication (AUX_ADV_IND) packets, and one or more auxiliary chain indication (AUX_CHAIN_IND) packets.

In this situation, if the first Bluetooth communication circuit 111 and the second Bluetooth communication circuit 121 operate in the LE Extended Passive Scan mode or the LE Extended Active Scan mode, then the first Bluetooth communication circuit 111 and the second Bluetooth communication circuit 121 may perform the operation 506 to receive the one or more target data items transmitted from the audio broadcasting device 150.

For yet another example, in some embodiments where the aforementioned target transmitting mode is the Scannable mode, the one or more target data items indicated in the aforementioned operation 502 and operation 504 may be one or more auxiliary scan response (AUX_SCAN_RSP) packets. Alternatively, the one or more target data items indicated in the aforementioned operation 502 and operation 504 may be a group of packets formed by one or more extended advertising indication (ADV_EXT_IND) packets, one or more auxiliary advertising indication (AUX_ADV_IND) packets, and one or more auxiliary scan response (AUX_SCAN_RSP) packets. Alternatively, the one or more target data items indicated in the aforementioned operation 502 and operation 504 may be a group of packets formed by one or more auxiliary scan response (AUX_SCAN_RSP) packets and one or more auxiliary chain indication (AUX_CHAIN_IND) packets. Alternatively, the one or more target data items indicated in the aforementioned operation 502 and operation 504 may be a group of packets formed by one or more extended advertising indication (ADV_EXT_IND) packets, one or more auxiliary advertising indication (AUX_ADV_IND) packets, one or more auxiliary scan response (AUX_SCAN_RSP) packets, and one or more auxiliary chain indication (AUX_CHAIN_IND) packets.

In this situation, if the first Bluetooth communication circuit 111 and the second Bluetooth communication circuit 121 operate in the LE Extended Active Scan mode, then the first Bluetooth communication circuit 111 and the second Bluetooth communication circuit 121 may perform the operation 506 to receive the one or more target data items transmitted from the audio broadcasting device 150.

For yet another example, in some embodiments where the aforementioned target transmitting mode is the Non-connectable mode, the Non-Scannable mode, the Periodic Advertising mode, the LE Extended Advertising mode, or the LE Periodic Advertising mode, the one or more target data items indicated in the aforementioned operation 502 and operation 504 may be one or more auxiliary synchronous indication (AUX_SYNC_IND) packets. Alternatively, the one or more target data items indicated in the aforementioned operation 502 and operation 504 may be a group of packets formed by one or more extended advertising indication (ADV_EXT_IND) packets, one or more auxiliary advertising indication (AUX_ADV_IND) packets, and one or more auxiliary synchronous indication (AUX_SYNC_IND) packets.

In this situation, if the first Bluetooth communication circuit 111 and the second Bluetooth communication circuit 121 operate in the Periodic Scanning mode, then the first Bluetooth communication circuit 111 and the second Bluetooth communication circuit 121 may perform the operation 506 to receive the one or more target data items transmitted from the audio broadcasting device 150.

For yet another example, in some embodiments where the aforementioned target transmitting mode is an advertising mode specified by the Bluetooth communication protocol of the Bluetooth Version 4.0, the one or more target data items indicated in the aforementioned operation 502 and operation 504 may be one or more advertising indication (ADV_IND) packets, one or more non-connectable advertising indication (ADV_NONCONN_IND) packets, or one or more discoverable advertisement indication (ADV_DISCOVER_IND) packets. Alternatively, the one or more target data items indicated in the aforementioned operation 502 and operation 504 may be a group of packets formed by one or more advertising indication (ADV_IND) packets and one or more non-connectable advertising indication (ADV_NONCONN_IND) packets. Alternatively, the one or more target data items indicated in the aforementioned operation 502 and operation 504 may be a group of packets formed by one or more advertising indication (ADV_IND) packets and one or more discoverable advertisement indication (ADV_DISCOVER_IND) packets. Alternatively, the one or more target data items indicated in the aforementioned operation 502 and operation 504 may be a group of packets formed by one or more advertising indication (ADV_IND) packets, one or more non-connectable advertising indication (ADV_NONCONN_IND) packets, and one or more discoverable advertisement indication (ADV_DISCOVER_IND) packets.

In this situation, if the first Bluetooth communication circuit 111 and the second Bluetooth communication circuit 121 operate in a mode capable of receiving the aforementioned target data items, then the first Bluetooth communication circuit 111 and the second Bluetooth communication circuit 121 may perform the operation 506 to receive the one or more target data items transmitted from the audio broadcasting device 150.

For yet another example, in some embodiments where the aforementioned target transmitting mode is the Broadcast Isochronous Broadcasting mode or the Broadcast Isochronous Synchronization mode, the one or more target data items indicated in the aforementioned operation 502 and operation 504 may be one or more BIS PDUs. Alternatively, the one or more target data items indicated in the aforementioned operation 502 and operation 504 may be one or more BIG PDUs. Alternatively, the one or more target data items indicated in the aforementioned operation 502 and operation 504 may be a group of PDUs formed by one or more BIS PDUs and one or more BIG PDUs.

In this situation, if the first Bluetooth communication circuit 111 and the second Bluetooth communication circuit 121 operate in an operation mode capable of receiving various PDUs through the BIS logical transports and/or capable of receiving various PDUs through the BIG logical transports, then the first Bluetooth communication circuit 111 and the second Bluetooth communication circuit 121 may perform the operation 506 to receive the one or more target data items transmitted from the audio broadcasting device 150.

Then, the first Bluetooth member device 110 performs the operation 508 and the operation 510, and the second Bluetooth member device 120 performs the operation 512 and the operation 514.

In the operation 508, the first control circuit 114 may parse the one or more target data items received by the first Bluetooth communication circuit 111 to extract a volume adjusting instruction.

In the operation 510, the first control circuit 114 may control the first audio processing circuit 112 to adjust an audio volume of the first audio playback circuit 113 according to the volume adjusting instruction. In operations, the first control circuit 114 may control the first audio processing circuit 112 to adjust a gain of the first audio playback circuit 113 according to the volume adjusting instruction, so as to adjust the audio volume of the first audio playback circuit 113.

In the operation 512, the second control circuit 124 may parse the one or more target data items received by the second Bluetooth communication circuit 121 to extract a volume adjusting instruction.

In the operation 514, the second control circuit 124 may control the second audio processing circuit 122 to adjust an audio volume of the second audio playback circuit 123 according to the volume adjusting instruction. In operations, the second control circuit 124 may control the second audio processing circuit 122 to adjust a gain of the second audio playback circuit 123 according to the volume adjusting instruction, so as to adjust the audio volume of the second audio playback circuit 123.

Since the first Bluetooth member device 110 and the second Bluetooth member device 120 adjust the audio volume according to the volume adjusting instruction contained in the target data items transmitted from the audio broadcasting device 150, when the first audio processing circuit 112 adjusts the audio volume of the first audio playback circuit 113, the second audio processing circuit 122 synchronously adjusts the audio volume of the second audio playback circuit 123. In other words, the operation 510 and the operation 510 are performed synchronously.

As shown in FIG. 5, after performing the aforementioned operation 504, the audio broadcasting device 150 may repeatedly perform the operation 222 and the operation 224 of FIG. 4 to broadcast subsequent predetermined audio data. After performing the operation 510, the first Bluetooth member device 110 may repeatedly perform the operation 226, the operation 228, and the operation 230 of FIG. 4 to receive and playback the subsequent predetermined audio data. After performing the operation 514, the second Bluetooth member device 120 may repeatedly perform the operation 226, the operation 232, and the operation 234 of FIG. 4 to receive and playback the subsequent predetermined audio data.

Similarly, other Bluetooth member devices in the Bluetooth audio broadcasting system 200 (e.g., the aforementioned third Bluetooth member device 130 and fourth Bluetooth member device 140) may receive the BLE audio packets broadcasted by the audio broadcasting device 150, playback the predetermined audio data contained in the BLE audio packets, and synchronously adjust the audio volume based on the volume adjusting instruction contained in the target data items transmitted from the audio broadcasting device 150 according to the foregoing approaches adopted by the first Bluetooth member device 110 or the second Bluetooth member device 120.

In other words, the audio source device 370 may instruct the audio broadcasting device 150 to broadcast a volume adjusting instruction to the first Bluetooth member device 110 and the second Bluetooth member device 120 according to the user's manipulation or command during the period at which the first Bluetooth member device 110 and the second Bluetooth member device 120 playback the audio data broadcasted by the audio broadcasting device 150, so as to synchronously adjust the audio volume of the first Bluetooth member device 110 and the second Bluetooth member device 120.

Similarly, the audio source device 370 may instruct the audio broadcasting device 150 to broadcast a volume adjusting instruction to the third Bluetooth member device 130 and the fourth Bluetooth member device 140 according to the user's manipulation or command during the period at which the third Bluetooth member device 130 and the fourth Bluetooth member device 140 playback the audio data broadcasted by the audio broadcasting device 150, so as to synchronously adjust the audio volume of the third Bluetooth member device 130 and the fourth Bluetooth member device 140.

As can be appreciated from the foregoing descriptions of FIG. 3 through FIG. 5, before the multi-member Bluetooth device in the Bluetooth audio broadcasting system 200 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 200 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, when beginning to synchronously playback the predetermined audio data, the audio volume of other Bluetooth member devices in the Bluetooth audio broadcasting system 200 can make the user feel comfortable and will not cause discomfort or displeasure to the user.

In addition, the audio source device 370 may instruct the audio broadcasting device 150 to broadcast a volume adjusting instruction to respective Bluetooth member devices according to the user's manipulation or command during the period at which the multi-member Bluetooth device in the Bluetooth audio broadcasting system 200 playbacks the audio data broadcasted by the audio broadcasting device 150, so as to synchronously adjust the audio volume of the respective Bluetooth member devices. In other words, the aforementioned Bluetooth audio broadcasting system 200 permits the user to synchronously adjust the audio volume of different Bluetooth member devices in the Bluetooth audio broadcasting system 200.

Moreover, the Bluetooth audio broadcasting system 200 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 200 not only reduces the power consumption of the multi-member Bluetooth device to thereby extend the serving time of the multi-member Bluetooth device, but also effectively improves the overall audio quality of audio broadcasting.

Figure 6:
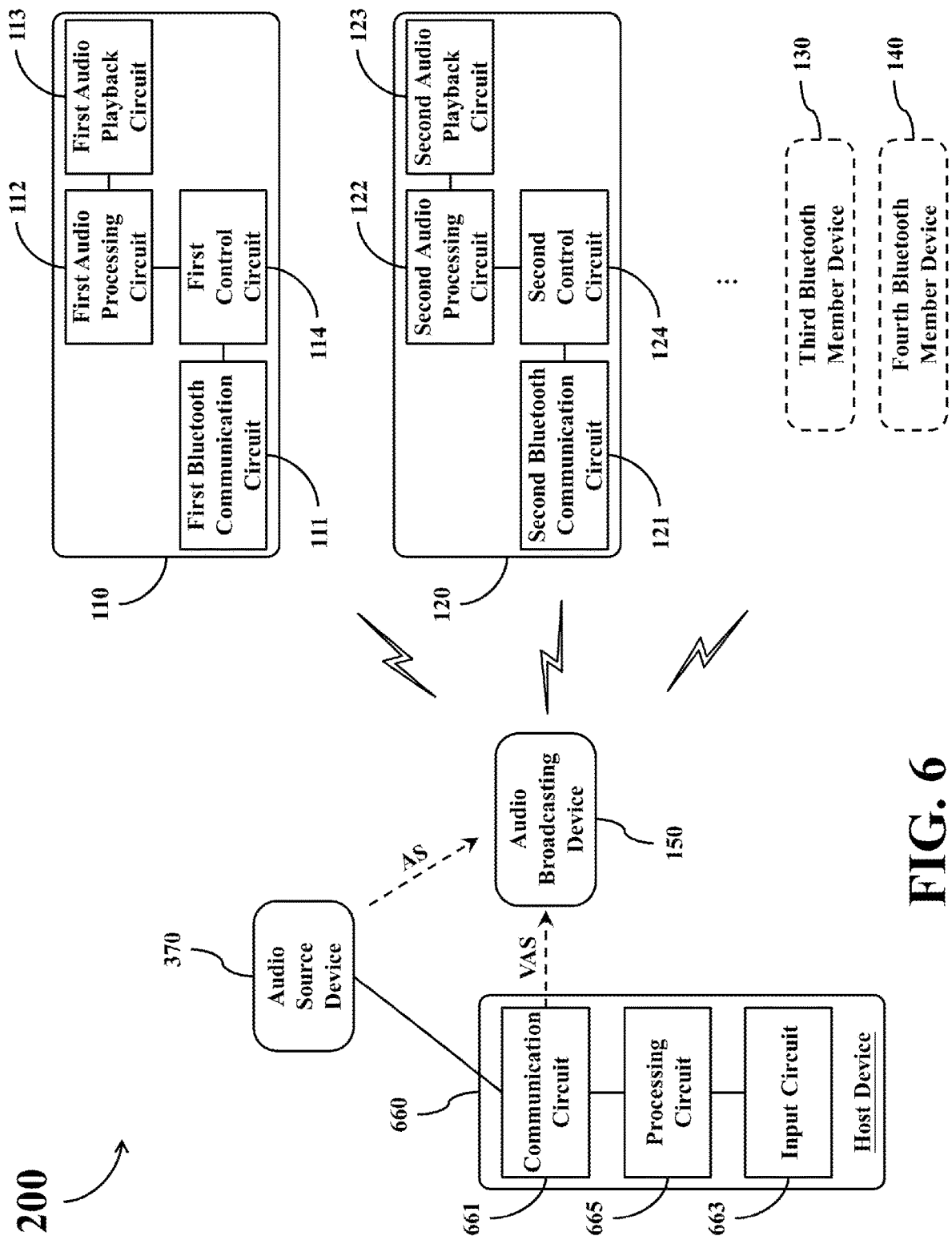
FIG. 6 shows a simplified functional block diagram of a Bluetooth audio broadcasting system according to a third embodiment of the present disclosure.

Please refer to FIG. 6, which shows a simplified functional block diagram of a Bluetooth audio broadcasting system 200 according to a third embodiment of the present disclosure. Similar to the Bluetooth audio broadcasting system 200 of FIG. 3, the Bluetooth audio broadcasting system 200 of FIG. 6 also comprises the audio broadcasting device 150, multiple Bluetooth member devices (e.g., the aforementioned first Bluetooth member device 110, second Bluetooth member device 120, third Bluetooth member device 130, and fourth Bluetooth member device 140), and the audio source device 370. In addition, the Bluetooth audio broadcasting system 200 of FIG. 6 further comprises a host device 660.

In the Bluetooth audio broadcasting system 200, the host device 660 is arranged to operably generate and transmit a volume adjusting signal VAS to the audio broadcasting device 150 according to the user's manipulation or command.

As shown in FIG. 6, the host device 660 comprises a communication circuit 661, an input circuit 663, and a processing circuit 665. The communication circuit 661 is arranged to operably conduct various data and command communications with the audio broadcasting device 150 and the audio source device 370 by utilizing various wired or wireless communication approaches. The input circuit 663 is arranged to operably permit a user of the host device 660 to conduct various manipulations on the host device 660, such as inputting instruction, configuring volume adjusting direction, configuring volume adjusting amount, or the like. The processing circuit 665 is coupled with the communication circuit 661 and the input circuit 663, and arranged to operably control the audio source device 370 through the communication circuit 661 or to operably receive instructions transmitted from the audio source device 370 through the communication circuit 661. The processing circuit 665 is further arranged to operably generate a volume adjusting signal VAS according to the user's manipulation on the input circuit 663 and to operably utilize the communication circuit 661 to transmit the volume adjusting signal VAS to the audio broadcasting device 150.

In practice, the communication circuit 661 may be realized with various wired transmission circuits, wireless transmission circuits, or hybrid circuits integrating the above two communication mechanisms. The input circuit 663 may be realized with a keyboard, a mouse, a remote control, a touch screen, a touch pad, a button, a resistive touch control circuit, a capacitive touch control circuit, a gyroscope, a voice activated input device, a gesture sensing device, a circuit adopting other command generating technologies, or a combination of the above devices. The processing circuit 665 may be realized with a single processor module, a combination of multiple processor modules, a single computer system, a combination of multiple computer systems, a single server, or a combination of multiple servers having appropriate computing ability and command processing ability.

In practical applications, different functional blocks of the aforementioned the host device 660 may be realized with separate circuits or may be integrated into a mobile communication device (e.g., a mobile phone), a wearable device, a tablet computer, a laptop computer, a desktop computer, a vehicular communication system, a satellite communication device, a smart speaker, or a video conference system.

Similar to the embodiment of FIG. 3, the audio source device 370 of FIG. 6 is arranged to operably receive the user's voice to generate a corresponding audio signal AS and to operably utilize various wired or wireless transmission approaches to transmit the audio signal AS to the audio broadcasting device 150. The audio broadcasting device 150 of FIG. 6 is arranged to operably convert the audio signal AS transmitted from the audio source device 370 into the predetermined audio data to be broadcasted. In other words, the contents of the predetermined audio data broadcasted by the audio broadcasting device 150 of FIG. 6 are originated from the audio source device 370.

However, the difference between the aforementioned Bluetooth audio broadcasting system 200 of FIG. 3 and the Bluetooth audio broadcasting system 200 of FIG. 6 is that the volume adjusting signal VAS is generated and transmitted to the audio broadcasting device 150 by the host device 660 instead of the audio source device 370 in the embodiment of FIG. 6.

In operations, the Bluetooth audio broadcasting system 200 in the embodiment of FIG. 6 may conduct audio broadcasting by adopting the aforementioned approach of FIG. 4. In addition, during the period at which the audio broadcasting device 150 conducts the audio broadcasting (i.e., during the period at which the audio broadcasting device 150 repeatedly performs the operation 222 and the operation 224 of FIG. 4), if the user of the host device 660 wants to adjust the audio volume of the first Bluetooth member device 110, the second Bluetooth member device 120, the third Bluetooth member device 130, and the fourth Bluetooth member device 140, the user may conduct a specific manipulation or instruct a specific command to the input circuit 663 of the host device 660, so as to render the processing circuit 665 to generate a volume adjusting signal VAS and transmit the volume adjusting signal VAS to the audio broadcasting device 150 by utilizing the communication circuit 661.

In this situation, the audio broadcasting device 150 of FIG. 6 may perform the aforementioned operation 502 and operation 504 of FIG. 5 according to the volume adjusting signal VAS generated by the host device 660, so as to instruct the Bluetooth member devices in the Bluetooth audio broadcasting system 200 (e.g., the aforementioned first Bluetooth member device 110, second Bluetooth member device 120, third Bluetooth member device 130, and fourth Bluetooth member device 140) to synchronously adjust their audio volume.

For example, the host device 660 may instruct the audio broadcasting device 150 to broadcast a volume adjusting instruction to the first Bluetooth member device 110, the second Bluetooth member device 120, the third Bluetooth member device 130, and the fourth Bluetooth member device 140 according to the user's manipulation or command during the period at which the first Bluetooth member device 110, the second Bluetooth member device 120, the third Bluetooth member device 130, and the fourth Bluetooth member device 140 playback the audio data broadcasted by the audio broadcasting device 150, so as to synchronously adjust the audio volume of the first Bluetooth member device 110, the second Bluetooth member device 120, the third Bluetooth member device 130, and the fourth Bluetooth member device 140.

In other words, the Bluetooth audio broadcasting system 200 of FIG. 6 also permits the user to synchronously adjust the audio volume of all of the Bluetooth member devices in the Bluetooth audio broadcasting system 200.

The foregoing descriptions regarding the implementations and connections of related circuits and devices of FIG. 3 are also applicable to the Bluetooth audio broadcasting system 200 of FIG. 6. The foregoing descriptions regarding the operations of FIG. 4 and FIG. 5 are also applicable to the Bluetooth audio broadcasting system 200 of FIG. 6. For the sake of brevity, the descriptions will not be repeated here.

Figure 7:
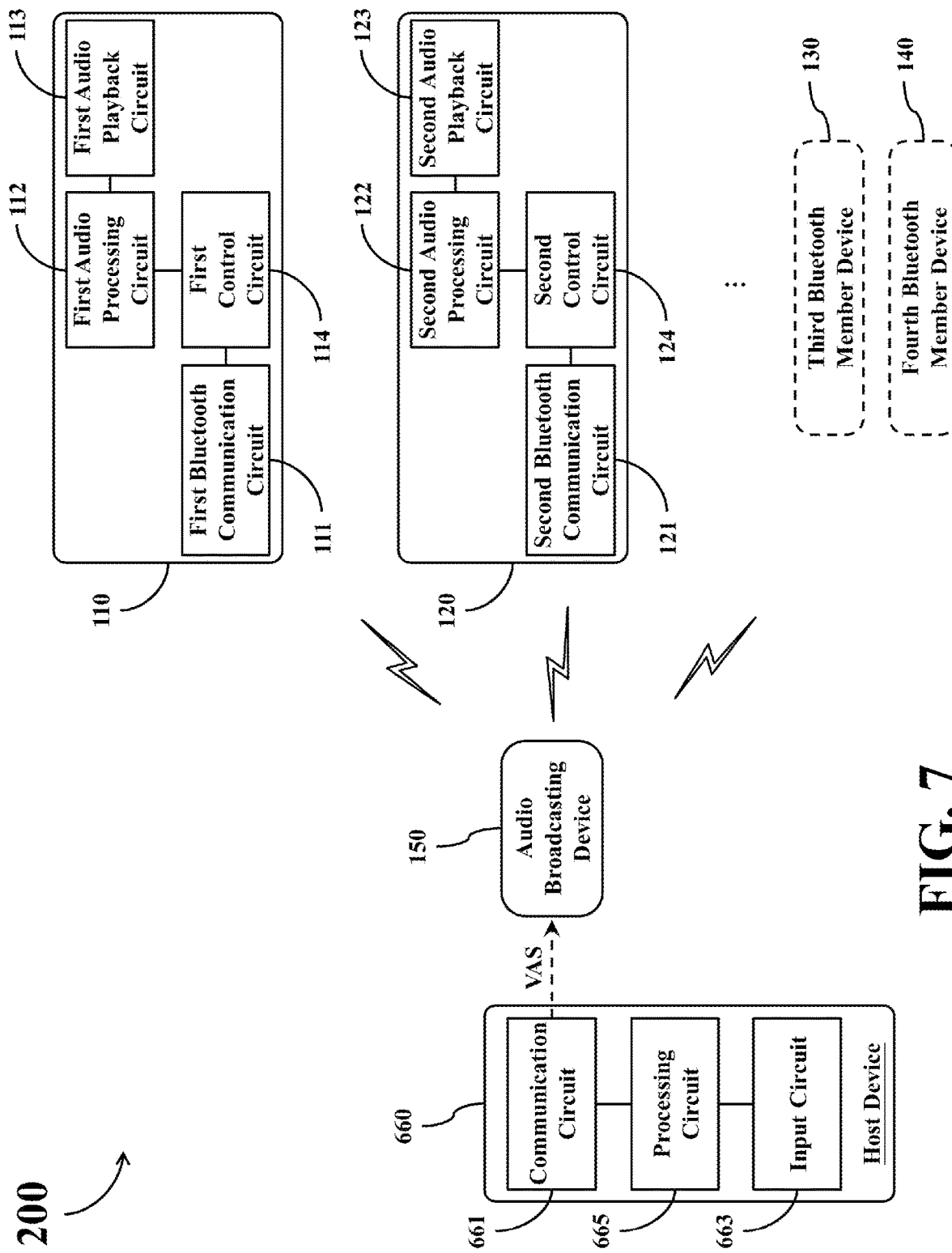
FIG. 7 shows a simplified functional block diagram of a Bluetooth audio broadcasting system according to a fourth embodiment of the present disclosure.

Please refer to FIG. 7, which shows a simplified functional block diagram of a Bluetooth audio broadcasting system 200 according to a fourth embodiment of the present disclosure. Similar to the Bluetooth audio broadcasting system 200 of FIG. 6, the Bluetooth audio broadcasting system 200 of FIG. 7 also comprises the audio broadcasting device 150, multiple Bluetooth member devices (e.g., the aforementioned first Bluetooth member device 110, second Bluetooth member device 120, third Bluetooth member device 130, and fourth Bluetooth member device 140), and the host device 660, but the aforementioned audio source device 370 is omitted in the Bluetooth audio broadcasting system 200 of FIG. 7.

In the embodiment of FIG. 7, the predetermined audio data to be broadcasted by the audio broadcasting device 150 may be the audio data prestored in the audio broadcasting device 150 or may be the audio data generated by the audio broadcasting device 150 according to the sound of the surroundings (e.g., the user's voice).

Similar to the aforementioned embodiment of FIG. 6, the volume adjusting signal VAS in the embodiment of FIG. 7 is generated and transmitted to the audio broadcasting device 150 by the host device 660.

In operations, the Bluetooth audio broadcasting system 200 in the embodiment of FIG. 7 may conduct audio broadcasting by adopting the aforementioned approach of FIG. 4. In addition, during the period at which the audio broadcasting device 150 conducts the audio broadcasting (i.e., during the period at which the audio broadcasting device 150 repeatedly perform the operation 222 and the operation 224 of FIG. 4), if the user of the host device 660 wants to adjust the audio volume of the first Bluetooth member device 110, the second Bluetooth member device 120, the third Bluetooth member device 130, and the fourth Bluetooth member device 140, the user may conduct a specific manipulation or instruct a specific command to the input circuit 663 of the host device 660, so as to render the processing circuit 665 to generate a volume adjusting signal VAS and transmit the volume adjusting signal VAS to the audio broadcasting device 150 by utilizing the communication circuit 661.

Similarly, the audio broadcasting device 150 of FIG. 7 may perform the aforementioned operation 502 and operation 504 of FIG. 5 according to the volume adjusting signal VAS generated by the host device 660, so as to instruct multiple Bluetooth member devices in the Bluetooth audio broadcasting system 200 (e.g., the aforementioned first Bluetooth member device 110, second Bluetooth member device 120, third Bluetooth member device 130, and fourth Bluetooth member device 140) to synchronously adjust their audio volume.

For example, the host device 660 may instruct the audio broadcasting device 150 to broadcast a volume adjusting instruction to the first Bluetooth member device 110, the second Bluetooth member device 120, the third Bluetooth member device 130, and the fourth Bluetooth member device 140 according to the user's manipulation or command during the period at which the first Bluetooth member device 110, the second Bluetooth member device 120, the third Bluetooth member device 130, and the fourth Bluetooth member device 140 playback the audio data broadcasted by the audio broadcasting device 150, so as to synchronously adjust the audio volume of the first Bluetooth member device 110, the second Bluetooth member device 120, the third Bluetooth member device 130, and the fourth Bluetooth member device 140.

In other words, the Bluetooth audio broadcasting system 200 of FIG. 7 also permits the user to synchronously adjust the audio volume of all of the Bluetooth member devices in the Bluetooth audio broadcasting system 200.

The foregoing descriptions regarding the implementations and connections of related circuits and devices of FIG. 3 or FIG. 6 are also applicable to the Bluetooth audio broadcasting system 200 of FIG. 7. The foregoing descriptions regarding the operations of FIG. 4 and FIG. 5 are also applicable to the Bluetooth audio broadcasting system 200 of FIG. 7. For the sake of brevity, the descriptions will not be repeated here.

As can be appreciated from the foregoing descriptions of FIG. 3 through FIG. 7, before the multi-member Bluetooth device in the Bluetooth audio broadcasting system 200 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the audio volume of the first audio playback circuit 113 and the second audio playback circuit 123 begins to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 200 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, the audio volume of other Bluetooth member devices in the Bluetooth audio broadcasting system 200 when beginning to playback the predetermined audio data can make the user feel comfortable and will not cause discomfort or displeasure to the user.

In addition, the audio source device 370 or the host device 660 may instruct the audio broadcasting device 150 to broadcast a volume adjusting instruction to respective Bluetooth member devices according to the user's manipulation or command during the period at which the multi-member Bluetooth device in the Bluetooth audio broadcasting system 200 playbacks the audio data broadcasted by the audio broadcasting device 150, so as to synchronously adjust the audio volume of the respective Bluetooth member devices. In other words, the aforementioned Bluetooth audio broadcasting system 200 permits the user to synchronously adjust the audio volume of different Bluetooth member devices in the Bluetooth audio broadcasting system 200.

Moreover, the Bluetooth audio broadcasting system 200 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 200 not only reduces the power consumption of the multi-member Bluetooth device to thereby extend the serving time of the multi-member Bluetooth device, but also effectively improves the overall audio quality of audio broadcasting.

Figure 8:
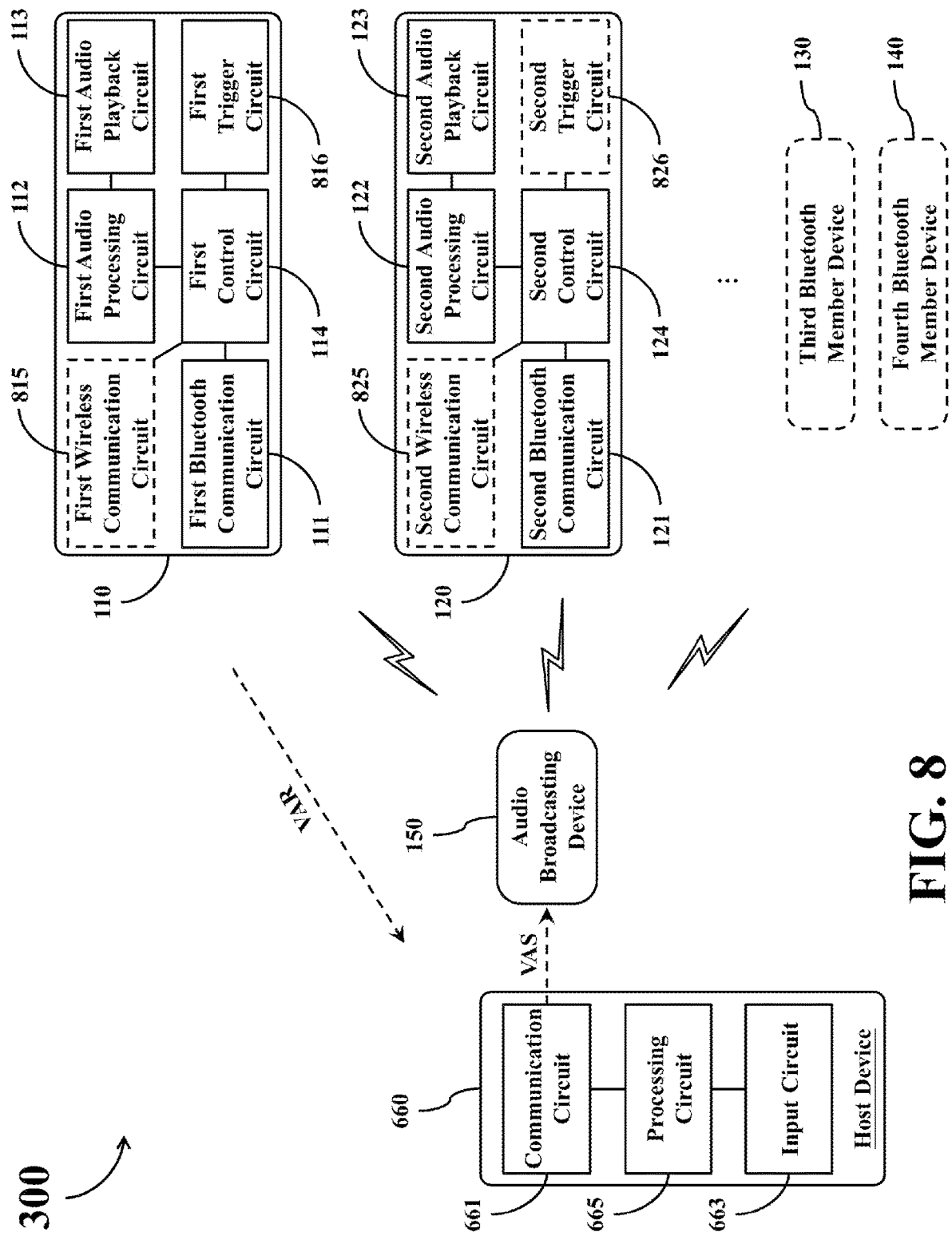
FIG. 8 shows a simplified functional block diagram of a Bluetooth audio broadcasting system according to a fifth embodiment of the present disclosure.

Please refer to FIG. 8, which shows a simplified functional block diagram of a Bluetooth audio broadcasting system 300 according to a fifth embodiment of the present disclosure. Similar to the Bluetooth audio broadcasting system 200 of FIG. 7, the Bluetooth audio broadcasting system 300 of FIG. 8 also comprises the audio broadcasting device 150, multiple Bluetooth member devices (e.g., the aforementioned first Bluetooth member device 110, second Bluetooth member device 120, third Bluetooth member device 130, and fourth Bluetooth member device 140), and the host device 660.

Different from the aforementioned embodiment of FIG. 7, a part of or all of the Bluetooth member devices in the Bluetooth audio broadcasting system 300 further comprise a trigger circuit and a wireless communication circuit. For example, in the embodiment of FIG. 8, the first Bluetooth member device 110 further comprises a first wireless communication circuit 815 and a first trigger circuit 816 in addition to the aforementioned first Bluetooth communication circuit 111, first audio processing circuit 112, first audio playback circuit 113, and first control circuit 114. Similarly, the second Bluetooth member device 120 further comprises a second wireless communication circuit 825 and a second trigger circuit 826 in addition to the aforementioned second Bluetooth communication circuit 121, second audio processing circuit 122, second audio playback circuit 123, and second control circuit 124.

In the first Bluetooth member device 110, the first wireless communication circuit 815 is coupled with the first control circuit 114 and arranged to operably utilize various Radio Access technologies (RAT) except for the Bluetooth communication approach to conduct various data and/or command communication with the host device 660 under the control of the first control circuit 114. The first trigger circuit 816 is coupled with the first control circuit 114 and arranged to operably generate a corresponding user trigger signal according to the user's simple manipulation. The first control circuit 114 may generate a volume adjustment request VAR when the first trigger circuit 816 generates the user trigger signal and may utilize the first wireless communication circuit 815 to transmit the volume adjustment request VAR to the host device 660.

The aforementioned Radio Access technologies may be various infrared signal transmission technologies, the near field communication (NFC) technology, the 2nd Generation (2G) mobile communication technology, various 3rd Generation (3G) mobile communication technologies, various 4th Generation (4G) mobile communication technologies, various 5th Generation (5G) mobile communication technologies, various wireless network communication technologies specified by the IEEE 802.11 series, various Internet-of-Thing (IoT) communication technologies, various Narrow Band Internet of Thing (NB-IoT) communication technologies, various Vehicle-to-Vehicle communication technologies, various Vehicle-to-Everything (V2X) communication technologies, various satellite communication technologies, various wireless communication technologies set by other standard setting organizations, or the like.

In the second Bluetooth member device 120, the second wireless communication circuit 825 is coupled with the second control circuit 124 and arranged to operably utilize the aforementioned various the Radio Access technologies (RAT) except for the Bluetooth communication approach to conduct various data and/or command communication with the host device 660 under the control of the second control circuit 124. The second trigger circuit 826 is coupled with the second control circuit 124 and arranged to operably generate a corresponding user trigger signal according to the user's simple manipulation. The second control circuit 124 may generate a volume adjustment request VAR when the second trigger circuit 826 generates the user trigger signal and may utilize the second wireless communication circuit 825 to transmit the volume adjustment request VAR to the host device 660.

In practice, the aforementioned first wireless communication circuit 815 and second wireless communication circuit 825 may be realized with various suitable circuits or chips supporting one or more types of the aforementioned Radio Access technologies. For example, each of the aforementioned first wireless communication circuit 815 and second wireless communication circuit 825 may be realized with an infrared signal transmission circuit, a near field communication (NFC) circuit, a Network Interface Card (NIC), a Wi-Fi circuit, a mobile communication circuit, a satellite communication circuit, an IoT communication circuit, or the like. The first wireless communication circuit 815 may be integrated with other functional blocks of the first Bluetooth member device 110 (e.g., the first Bluetooth communication circuit 111). Similarly, the second wireless communication circuit 825 may be integrated with other functional blocks of the second Bluetooth member device 120 (e.g., the second Bluetooth communication circuit 121).

The aforementioned first trigger circuit 816 and second trigger circuit 826 may be realized with various devices capable of generating a corresponding user trigger signal according to the user's simple manipulation. For example, the aforementioned first trigger circuit 816 and second trigger circuit 826 may be realized with various touch control circuits, buttons, switches, remote controls, touch screens, voice activated devices, gesture sensing devices, gyroscopes, circuits adopting other trigger signal generating technologies, or a combination of the above various devices. The first trigger circuit 816 may be configured outside of the first Bluetooth member device 110, or may be integrated with other functional blocks of the first Bluetooth member device 110. Similarly, the second trigger circuit 826 may be configured outside of the second Bluetooth member device 120, or may be integrated with other functional blocks of the second Bluetooth member device 120.

Other Bluetooth member devices in the Bluetooth audio broadcasting system 300 may be provided with corresponding trigger circuit and wireless communication circuit according to the aforementioned structure of the first Bluetooth member device 110 or second Bluetooth member device 120.

In the embodiment of FIG. 8, multiple Bluetooth member devices in the Bluetooth audio broadcasting system 300 (e.g., the aforementioned first Bluetooth member device 110, second Bluetooth member device 120, third Bluetooth member device 130, and fourth Bluetooth member device 140) may collectively form a multi-member Bluetooth device, such as a group of multi-channel Bluetooth speakers.

In operations, the Bluetooth audio broadcasting system 300 may conduct audio broadcasting to the aforementioned multi-member Bluetooth device by adopting the aforementioned approach of FIG. 4.

In addition, during the period at which the audio broadcasting device 150 conducts the audio broadcasting (i.e., during the period at which the audio broadcasting device 150 repeatedly performs the operation 222 and the operation 224 of FIG. 4), if the user of the aforementioned multi-member Bluetooth device wants to adjust the audio volume of all of the Bluetooth member devices, the user may conduct a specific manipulation to the first trigger circuit 816 of the first Bluetooth member device 110, so as to render the first trigger circuit 816 to generate a user trigger signal and transmit the user trigger signal to the first control circuit 114. Alternatively, the user may conduct the specific manipulation to the second trigger circuit 826 of the second Bluetooth member device 120, so as to render the second trigger circuit 826 to generate a user trigger signal and transmit the user trigger signal to the second control circuit 124.

If the user conducts the specific manipulation to the first trigger circuit 816, then the first control circuit 114 may generate a volume adjustment request VAR according to the user trigger signal generated by the first trigger circuit 816 and may utilize the first wireless communication circuit 815 to transmit the volume adjustment request VAR to the communication circuit 661 of the host device 660. Similarly, if the user conducts the specific manipulation to the second trigger circuit 826, then the second control circuit 124 may generate a volume adjustment request VAR according to the user trigger signal generated by the second trigger circuit 826 and may utilize the second wireless communication circuit 825 to transmit the volume adjustment request VAR to the communication circuit 661 of the host device 660.

In the embodiment of FIG. 8, when the communication circuit 661 of the host device 660 receives the volume adjustment request VAR transmitted from the first Bluetooth member device 110 or the second Bluetooth member device 120, the processing circuit 665 generates a volume adjusting signal VAS and utilize the communication circuit 661 to transmit the volume adjusting signal VAS to the audio broadcasting device 150.

Similarly, the audio broadcasting device 150 of FIG. 8 may perform the aforementioned operation 502 and operation 504 of FIG. 5 according to the volume adjusting signal VAS generated by the host device 660, so as to instruct multiple Bluetooth member devices in the Bluetooth audio broadcasting system 300 (e.g., the aforementioned first Bluetooth member device 110, second Bluetooth member device 120, third Bluetooth member device 130, and fourth Bluetooth member device 140) to synchronously adjust their audio volume.

For example, the host device 660 may instruct the audio broadcasting device 150 to broadcast a volume adjusting instruction to the first Bluetooth member device 110, the second Bluetooth member device 120, the third Bluetooth member device 130, and the fourth Bluetooth member device 140 according to the volume adjustment request VAR transmitted from any one of the Bluetooth member devices (e.g., the aforementioned first Bluetooth member device 110 or second Bluetooth member device 120) during the period at which the first Bluetooth member device 110, the second Bluetooth member device 120, the third Bluetooth member device 130, and the fourth Bluetooth member device 140 playback the audio data broadcasted by the audio broadcasting device 150, so as to synchronously adjust the audio volume of the first Bluetooth member device 110, the second Bluetooth member device 120, the third Bluetooth member device 130, and the fourth Bluetooth member device 140.

In other words, the Bluetooth audio broadcasting system 300 of FIG. 8 also permits the user to synchronously adjust the audio volume of all of the Bluetooth member devices in the Bluetooth audio broadcasting system 300.

The foregoing descriptions regarding the implementations and connections of the related circuits and devices of FIG. 3, FIG. 6, or FIG. 7 are also applicable to the Bluetooth audio broadcasting system 300 of FIG. 8. The foregoing descriptions regarding the operations of FIG. 4 and FIG. 5 are also applicable to the Bluetooth audio broadcasting system 300 of FIG. 8. For the sake of brevity, the descriptions will not be repeated here.

As can be appreciated from the foregoing descriptions, in the Bluetooth audio broadcasting system 300, the first Bluetooth member device 110 may utilize the first wireless communication circuit 815 to transmit a volume adjustment request VAR to the host device 660, and the second Bluetooth member device 120 may utilize the second wireless communication circuit 825 to transmit a volume adjustment request VAR to the host device 660. This is merely an exemplary embodiment, rather than a restriction to the practical implementations of the present disclosure. In practice, the first Bluetooth member device 110 or the second Bluetooth member device 120 may instead adopt other approaches to transmit the volume adjustment request VAR to the host device 660.

For example, in another embodiment, the first Bluetooth member device 110 may utilize the first Bluetooth communication circuit 111 to transmit the volume adjustment request VAR to the host device 660, and the second Bluetooth member device 120 may utilize the second Bluetooth communication circuit 121 to transmit the volume adjustment request VAR to the host device 660. In this situation, the aforementioned first wireless communication circuit 815 and/or second wireless communication circuit 825 may be omitted.

In addition, in some embodiments, the second trigger circuit 826 of the second Bluetooth member device 120 of FIG. 8 may be omitted.

Figure 9:
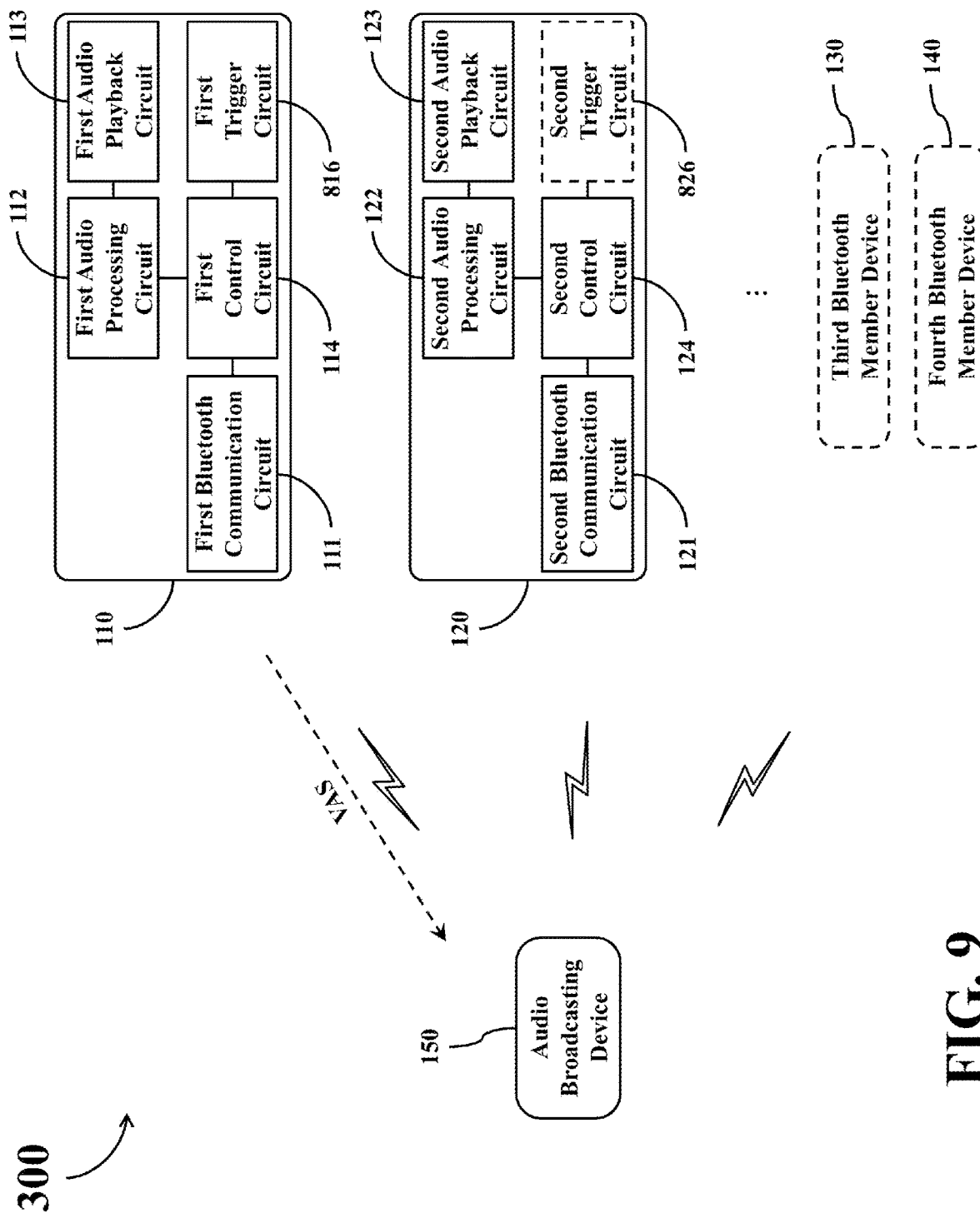
FIG. 9 shows a simplified functional block diagram of a Bluetooth audio broadcasting system according to a sixth embodiment of the present disclosure.

Please refer to FIG. 9, which shows a simplified functional block diagram of a Bluetooth audio broadcasting system 300 according to a sixth embodiment of the present disclosure. Similar to the Bluetooth audio broadcasting system 300 of FIG. 8, the Bluetooth audio broadcasting system 300 of FIG. 9 also comprises the audio broadcasting device 150 and multiple Bluetooth member devices (e.g., the aforementioned first Bluetooth member device 110, second Bluetooth member device 120, third Bluetooth member device 130, and fourth Bluetooth member device 140), but the aforementioned host device 660 is omitted in the Bluetooth audio broadcasting system 300 of FIG. 9.

In addition, different from the aforementioned embodiment of FIG. 8, a part of or all of the Bluetooth member devices in the Bluetooth audio broadcasting system 300 of FIG. 9 further comprises trigger circuits, while the aforementioned wireless communication circuits are omitted. For example, in the embodiment of FIG. 9, the first Bluetooth member device 110 comprises the aforementioned first Bluetooth communication circuit 111, first audio processing circuit 112, first audio playback circuit 113, first control circuit 114, and first trigger circuit 816, but does not comprise the first wireless communication circuit 815. Similarly, the second Bluetooth member device 120 comprises the aforementioned second Bluetooth communication circuit 121, second audio processing circuit 122, second audio playback circuit 123, second control circuit 124, and second trigger circuit 826, but does not comprise the second wireless communication circuit 825.

Other Bluetooth member devices in the Bluetooth audio broadcasting system 300 of FIG. 9 may be provided with a corresponding trigger circuit according to the aforementioned structure of the first Bluetooth member device 110 or the second Bluetooth member device 120.

In the embodiment of FIG. 9, multiple Bluetooth member devices in the Bluetooth audio broadcasting system 300 (e.g., the aforementioned first Bluetooth member device 110, second Bluetooth member device 120, third Bluetooth member device 130, and fourth Bluetooth member device 140) may collectively form a multi-member Bluetooth device, such as a group of multi-channel Bluetooth speakers.

In operations, the Bluetooth audio broadcasting system 300 of FIG. 9 may conduct audio broadcasting to the aforementioned multi-member Bluetooth device by adopting the aforementioned approaches of FIG. 4.

In addition, during the period at which the audio broadcasting device 150 conducts the audio broadcasting (i.e., during the period at which the audio broadcasting device 150 repeatedly performs the operation 222 and the operation 224 of FIG. 4), if the user of the aforementioned multi-member Bluetooth device wants to adjust the audio volume of all of the Bluetooth member devices, the user may conduct a specific manipulation to the first trigger circuit 816 of the first Bluetooth member device 110, so as to render the first trigger circuit 816 to generate a user trigger signal and transmit the user trigger signal to the first control circuit 114. Alternatively, the user may conduct the specific manipulation to the second trigger circuit 826 of the second Bluetooth member device 120, so as to render the second trigger circuit 826 to generate a user trigger signal and transmit the user trigger signal to the second control circuit 124.

In the embodiment of FIG. 9, if the user conducts the specific manipulation to the first trigger circuit 816, then the first control circuit 114 may generate a volume adjusting signal VAS according to the user trigger signal generated by the first trigger circuit 816 and utilize the first Bluetooth communication circuit 111 to transmit the volume adjusting signal VAS to the audio broadcasting device 150. Similarly, if the user conducts the specific manipulation to the second trigger circuit 826, then the second control circuit 124 may generate a volume adjusting signal VAS according to the user trigger signal generated by the second trigger circuit 826 and utilize the second Bluetooth communication circuit 121 to transmit the volume adjusting signal VAS to the audio broadcasting device 150.

When the audio broadcasting device 150 of FIG. 9 receives the volume adjusting signal VAS transmitted from the first Bluetooth member device 110 or the second Bluetooth member device 120, the audio broadcasting device 150 may perform the aforementioned operation 502 and operation 504 of FIG. 5 to instruct multiple Bluetooth member devices in the Bluetooth audio broadcasting system 300 (e.g., the aforementioned first Bluetooth member device 110, second Bluetooth member device 120, third Bluetooth member device 130, and fourth Bluetooth member device 140) to synchronously adjust their audio volume.

For example, the audio broadcasting device 150 may generate and broadcast a volume adjusting instruction to the first Bluetooth member device 110, the second Bluetooth member device 120, the third Bluetooth member device 130, and the fourth Bluetooth member device 140 according to a volume adjusting signal VAS transmitted from any one of the Bluetooth member devices (e.g., the aforementioned first Bluetooth member device 110 or second Bluetooth member device 120) during the period at which the first Bluetooth member device 110, the second Bluetooth member device 120, the third Bluetooth member device 130, and the fourth Bluetooth member device 140 playback the audio data broadcasted by the audio broadcasting device 150, so as to synchronously adjust the audio volume of the first Bluetooth member device 110, the second Bluetooth member device 120, the third Bluetooth member device 130, and the fourth Bluetooth member device 140.

In other words, the Bluetooth audio broadcasting system 300 of FIG. 9 also permits the user to synchronously adjust the audio volume of all of the Bluetooth member devices in the Bluetooth audio broadcasting system 300.

The foregoing descriptions regarding the implementations and connections of the related circuits and devices of FIG. 3, FIG. 6, FIG. 7, or FIG. 8 are also applicable to the Bluetooth audio broadcasting system 300 of FIG. 9. The foregoing descriptions regarding the operations of FIG. 4 and FIG. 5 are also applicable to the Bluetooth audio broadcasting system 300 of FIG. 9. For the sake of brevity, the descriptions will not be repeated here.

In some embodiments, the second trigger circuit 826 of the second Bluetooth member device 120 of FIG. 9 may be omitted.

As can be appreciated from the foregoing descriptions of FIG. 4, FIG. 5, FIG. 8, and FIG. 9, before the multi-member Bluetooth device in the Bluetooth audio broadcasting system 300 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 300 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, when beginning to synchronously playback the predetermined audio data, the audio volume of other Bluetooth member devices in the Bluetooth audio broadcasting system 300 can make the user feel comfortable and will not cause discomfort or displeasure to the user.

In addition, the user may conduct a simple manipulation to the trigger circuit of one of the Bluetooth member devices during the period at which the multi-member Bluetooth device in the Bluetooth audio broadcasting system 300 playbacks the audio data broadcasted by the audio broadcasting device 150, so as to render the Bluetooth member device to directly instruct the audio broadcasting device 150 (or to indirectly instruct the audio broadcasting device 150 through the host device 660) to broadcast a volume adjusting instruction to respective Bluetooth member devices to synchronously adjust the audio volume of the respective Bluetooth member devices. In other words, the aforementioned Bluetooth audio broadcasting system 300 permits the user to synchronously adjust the audio volume of different Bluetooth member devices in the Bluetooth audio broadcasting system 300.

Moreover, the Bluetooth audio broadcasting system 300 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 300 not only reduces the power consumption of the multi-member Bluetooth device to thereby extend the serving time of the multi-member Bluetooth device, but also effectively improves the overall audio quality of audio broadcasting.

Figure 10:
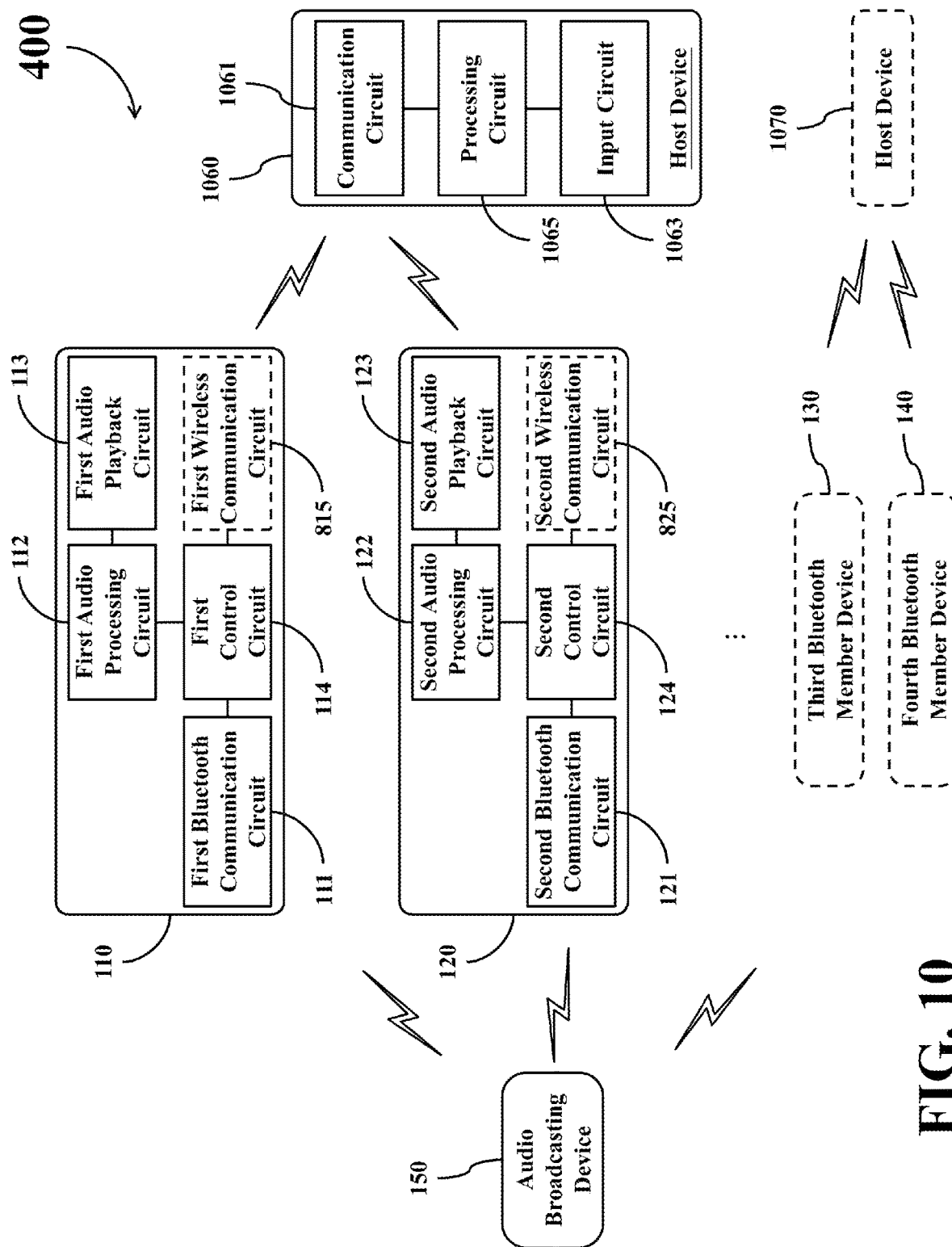
FIG. 10 shows a simplified functional block diagram of a Bluetooth audio broadcasting system according to a seventh embodiment of the present disclosure.

Please refer to FIG. 10, which shows a simplified functional block diagram of a Bluetooth audio broadcasting system 400 according to a seventh embodiment of the present disclosure.

In the embodiment of FIG. 10, the Bluetooth audio broadcasting system 400 comprises the audio broadcasting device 150, multiple Bluetooth member devices (e.g., the aforementioned first Bluetooth member device 110, second Bluetooth member device 120, third Bluetooth member device 130, and fourth Bluetooth member device 140), and one or more host devices. For the convenience of description, merely two exemplary host devices are shown in the embodiment of FIG. 10, which respectively are a host device 1060 and a host device 1070.

In the Bluetooth audio broadcasting system 400, the host device 1060 is arranged to operably instruct multiple Bluetooth member devices in the Bluetooth audio broadcasting system 400 to synchronously adjust their audio volume according to the user's manipulation or command.

As shown in FIG. 10, the host device 1060 comprises a communication circuit 1061, an input circuit 1063, and a processing circuit 1065. The communication circuit 1061 is arranged to operably conduct various data and command communications with multiple Bluetooth member devices in the Bluetooth audio broadcasting system 400 by utilizing various wired or wireless communication approaches. The input circuit 1063 is arranged to operably permit a user of the host device 1060 to conduct various manipulations on the host device 1060, such as inputting instruction, configuring volume adjusting direction, configuring volume adjusting amount, or the like. The processing circuit 1065 is coupled with the communication circuit 1061 and the input circuit 1063, and arranged to operably generate a volume adjusting instruction according to the user's manipulation on the input circuit 1063, and to operably utilize the communication circuit 1061 to transmit the volume adjusting instruction to multiple Bluetooth member devices in the Bluetooth audio broadcasting system 400.

Additionally, in the embodiment of FIG. 10, the first Bluetooth member device 110 comprises the aforementioned first Bluetooth communication circuit 111, first audio processing circuit 112, first audio playback circuit 113, first control circuit 114, and first wireless communication circuit 815. Similarly, the second Bluetooth member device 120 comprises the aforementioned second Bluetooth communication circuit 121, second audio processing circuit 122, second audio playback circuit 123, second control circuit 124, and second wireless communication circuit 825.

Similar to the aforementioned embodiment of FIG. 8, the first wireless communication circuit 815 of FIG. 10 is coupled with the first control circuit 114 and arranged to operably utilize various Radio Access technologies (RAT) except for the Bluetooth communication approach to conduct various data and/or command communication with the communication circuit 1061 of the host device 1060 under the control of the first control circuit 114. Similarly, the second wireless communication circuit 825 is coupled with the second control circuit 124 and arranged to operably utilize various Radio Access technologies (RAT) except for the Bluetooth communication approach to conduct various data and/or command communication with the communication circuit 1061 of the host device 1060 under the control of the second control circuit 124.

Figure 11:
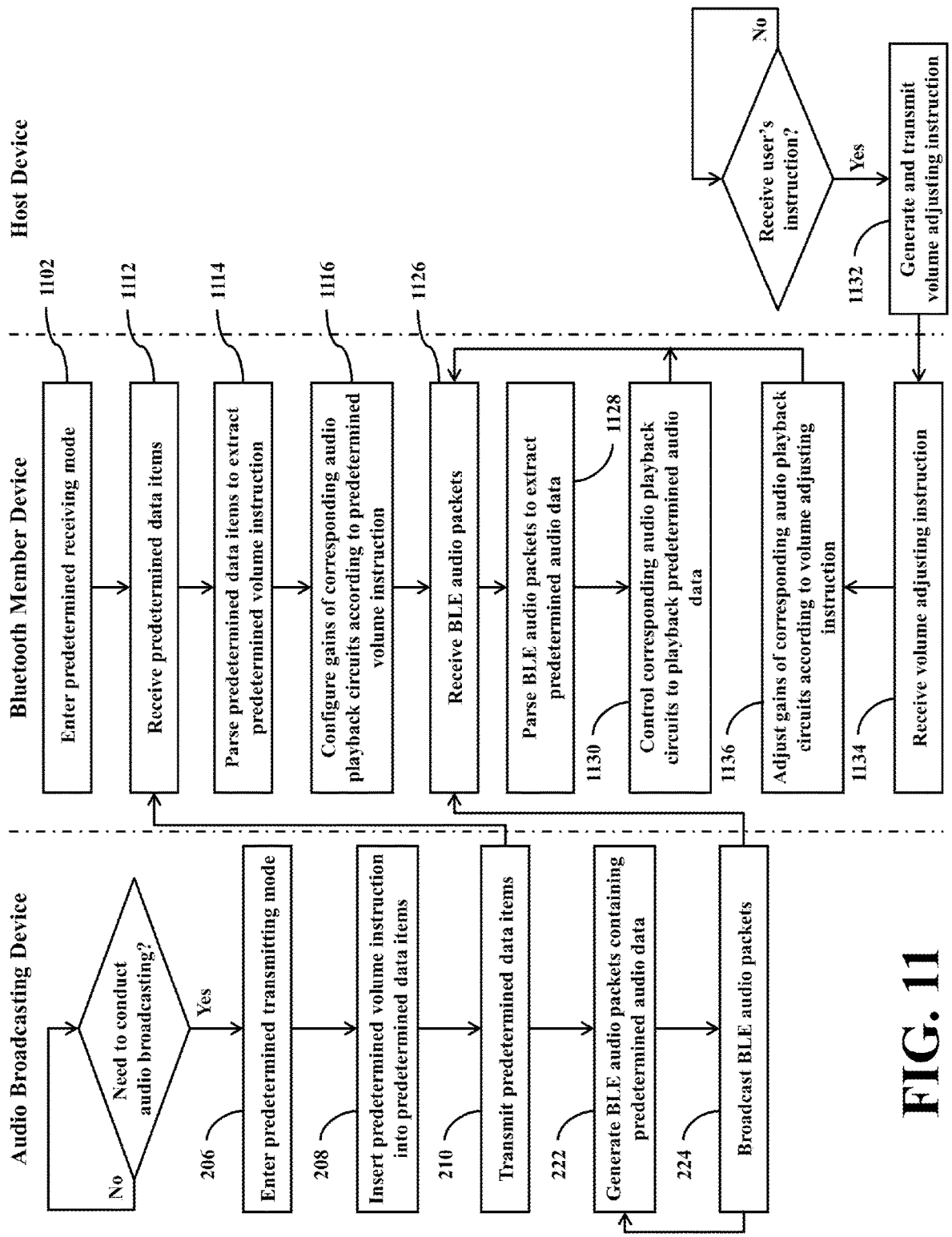
FIG. 11 shows a simplified flowchart of a method for conducting audio broadcasting by utilizing the BLE Audio technology according to a third embodiment of the present disclosure.

The operations of the Bluetooth audio broadcasting system 400 will be further described below by reference to FIG. 11. FIG. 11 shows a simplified flowchart of a method for conducting audio broadcasting by utilizing the BLE Audio technology according to a third embodiment of the present disclosure.

When the user wants to utilize the first Bluetooth member device 110 and the second Bluetooth member device 120 in the Bluetooth audio broadcasting system 400 to receive an audio broadcasting, the first Bluetooth member device 110 and the second Bluetooth member device 120 may perform the operation 1102 of FIG. 11. In this embodiment, the operations of the first Bluetooth member device 110 in the operation 1102 are substantially the same as that in the aforementioned operation 202 of FIG. 2, and the operations of the second Bluetooth member device 120 in the operation 1102 are substantially the same as that in the aforementioned operation 204 of FIG. 2.

As shown in FIG. 11, when the audio broadcasting device 150 needs to conduct the audio broadcasting, the audio broadcasting device 150 may perform the operation 206 through the operation 210 of FIG. 11. The operation 206 through the operation 210 of FIG. 11 conducted by the audio broadcasting device 150 are identical to the corresponding operations of aforementioned FIG. 2. That is, the audio broadcasting device 150 may insert a predetermined volume instruction corresponding to a predetermined volume into one or more predetermined data items. In addition, the audio broadcasting device 150 may transmit the aforementioned one or more predetermined data items under the predetermined transmitting mode, so that multiple Bluetooth member devices in the Bluetooth audio broadcasting system 400 (e.g., the first Bluetooth member device 110, the second Bluetooth member device 120, the third Bluetooth member device 130, and the fourth Bluetooth member device 140) can receive the aforementioned one or more predetermined data items.

Then, the first Bluetooth member device 110 and the second Bluetooth member device 120 may perform the operation 1112 and the operation 1114 of FIG. 11. In this embodiment, the operations of the first Bluetooth member device 110 in the operation 1112 and the operation 1114 are respectively the same as that in the aforementioned operation 212 and operation 214 of FIG. 2, and the operations of the second Bluetooth member device 120 in the operation 1112 and the operation 1114 are respectively the same as that in the aforementioned operation 212 and the operation 218 of FIG. 2.

Then, the first Bluetooth member device 110 and the second Bluetooth member device 120 may perform the operation 1116 of FIG. 11 to configure the gains of corresponding audio playback circuits according to the predetermined volume instruction transmitted from the audio broadcasting device 150. In this embodiment, the operations of the first Bluetooth member device 110 in operation 1116 are substantially the same as that in the aforementioned operation 216 of FIG. 2, and the operations of the second Bluetooth member device 120 in operation 1116 are substantially the same as that in the aforementioned operation 220 of FIG. 2.

For example, in the operation 1116, the first control circuit 114 may control the first audio processing circuit 112 to configure a gain of the first audio playback circuit 113 according to the predetermined volume instruction, so as to adjust the audio volume of the first audio playback circuit 113 to be close to or equal to the aforementioned predetermined volume in advance. Similarly, in the operation 1116, the second control circuit 124 may control the second audio processing circuit 122 to configure a gain of the second audio playback circuit 123 according to the predetermined volume instruction, so as to adjust the audio volume of the second audio playback circuit 123 to be close to or equal to the aforementioned predetermined volume in advance.

In other words, in this embodiment, before playbacking the audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

As shown in FIG. 11, after performing the operation 210, the audio broadcasting device 150 further perform the operation 222 and the operation 224. On the other hand, the first Bluetooth member device 110 and the second Bluetooth member device 120 may perform the operation 1126, the operation 1128, and the operation 1130 of FIG. 11. In this embodiment, the operations of the first Bluetooth member device 110 in the operation 1126, the operation 1128, and the operation 1130 are respectively the same as the aforementioned operation 226, operation 228, and operation 230 of FIG. 2, and the operations of the second Bluetooth member device 120 in the operation 1126, the operation 1128, and the operation 1130 are respectively the same as the aforementioned operation 226, operation 232, and operation 234 of FIG. 2.

The audio broadcasting device 150 may repeatedly perform the operation 222 and the operation 224 of FIG. 11 to broadcast subsequent predetermined audio data. On the other hand, the first Bluetooth member device 110 and the second Bluetooth member device 120 may repeatedly perform the operation 1126, the operation 1128, and the operation 1130 to receive and playback the subsequent predetermined audio data.

As can be appreciated from the foregoing descriptions, the audio broadcasting device 150 of FIG. 10 may adopt the BLE Audio technology specified by the Bluetooth Core Specification Version 5.2 or newer versions to broadcast the predetermined audio data. In operations, the audio broadcasting device 150 may broadcast the BLE audio packets containing the predetermined audio data to multiple Bluetooth member devices in the Bluetooth audio broadcasting system 400 (e.g., the first Bluetooth member device 110, the second Bluetooth member device 120, the third Bluetooth member device 130, and the fourth Bluetooth member device 140) through the BIS logical transports.

During the period at which the audio broadcasting device 150 of FIG. 10 conducts the audio broadcasting (i.e., during the period at which the audio broadcasting device 150 repeatedly performs the operation 222 and the operation 224 of FIG. 11), if the user of the host device 1060 wants to adjust the audio volume of multiple Bluetooth member devices (e.g., the first Bluetooth member device 110 and the second Bluetooth member device 120), the user may conduct a specific manipulation (e.g., inputting instruction, configuring a volume adjusting direction, configuring a volume adjusting amount, or the like.) to the input circuit 1063 of the host device 1060. In this situation, the processing circuit 1065 may perform the operation 1132 of FIG. 11.

In the operation 1132, the processing circuit 1065 may generate a volume adjusting instruction for instructing a volume adjusting direction (e.g., turning up or turning down) according to the user's manipulation on the input circuit 1063, and may utilize the communication circuit 1061 to transmit the volume adjusting instruction to the first wireless communication circuit 815 of the first Bluetooth member device 110 and the second wireless communication circuit 825 of the second Bluetooth member device 120 by adopting various Radio Access technologies (RAT) except for the Bluetooth communication approach.

In the operation 1134, the first wireless communication circuit 815 and the second wireless communication circuit 825 may receive the volume adjusting instruction transmitted from the host device 1060.

Then, the first Bluetooth member device 110 and the second Bluetooth member device 120 may perform the operation 1136 to adjust a gain of a corresponding audio playback circuit according to the volume adjusting instruction transmitted from the host device 1060. In this embodiment, the operations of the first Bluetooth member device 110 in operation 1136 are substantially the same as that in the aforementioned operation 510 of FIG. 5, and the operations of the second Bluetooth member device 120 in operation 1136 are substantially the same as that in the aforementioned operation 514 of FIG. 5.

For example, in the operation 1136, the first control circuit 114 may control the first audio processing circuit 112 to adjust the gain of the first audio playback circuit 113 according to the volume adjusting instruction transmitted from the host device 1060, so as to adjust the audio volume of the first audio playback circuit 113. Similarly, in the operation 1136, the second control circuit 124 may control the second audio processing circuit 122 to adjust the gain of the second audio playback circuit 123 according to the volume adjusting instruction transmitted from the host device 1060, so as to adjust the audio volume of the second audio playback circuit 123.

Since the first Bluetooth member device 110 and the second Bluetooth member device 120 adjust their audio volume according to the volume adjusting instruction transmitted from the host device 1060, when the first audio processing circuit 112 adjusts the audio volume of the first audio playback circuit 113, the second audio processing circuit 122 may synchronously adjust the audio volume of the second audio playback circuit 123.

In other words, during the period at which the first Bluetooth member device 110 and the second Bluetooth member device 120 playback the audio data broadcasted by the audio broadcasting device 150, the host device 1060 may generate and transmit a volume adjusting instruction to the first Bluetooth member device 110 and the second Bluetooth member device 120 according to the user's manipulation or command, so as to synchronously adjust the audio volume of the first Bluetooth member device 110 and the second Bluetooth member device 120.

As can be appreciated from the foregoing descriptions, the Bluetooth audio broadcasting system 400 permits the user to synchronously adjust the audio volume of related Bluetooth member devices in the Bluetooth audio broadcasting system 400.

In the aforementioned Bluetooth audio broadcasting system 400, the communication circuit 1061 of the host device 1060 utilizes various Radio Access technologies (RAT) except for the Bluetooth communication approach to transmit the volume adjusting instruction to the first wireless communication circuit 815 of the first Bluetooth member device 110 and the second wireless communication circuit 825 of the second Bluetooth member device 120. This is merely an exemplary embodiment, rather than a restriction to the practical implementations of the present disclosure. In practice, the communication circuit 1061 of the host device 1060 may instead utilize other transmission mechanism to transmit the volume adjusting instruction to the first Bluetooth member device 110 and the second Bluetooth member device 120.

For example, in another embodiment, the communication circuit 1061 of the host device 1060 may instead utilize the Bluetooth communication technology to transmit the volume adjusting instruction, so as to transmit the volume adjusting instruction to the first Bluetooth communication circuit 111 of the first Bluetooth member device 110 and the second Bluetooth communication circuit 121 of the second Bluetooth member device 120. In this situation, the first Bluetooth member device 110 may utilize the first Bluetooth communication circuit 111 to receive the volume adjusting instruction transmitted from the host device 1060, and the second Bluetooth member device 120 may utilize the second Bluetooth communication circuit 121 to receive the volume adjusting instruction transmitted from the host device 1060. As a result, the first wireless communication circuit 815 and/or the second wireless communication circuit 825 of FIG. 10 may be omitted.

In some embodiment where the communication circuit 1061 of the host device 1060 utilizes the Bluetooth communication technology to transmit the volume adjusting instruction to the first Bluetooth member device 110 and the second Bluetooth member device 120, the processing circuit 1065 of the host device 1060 may insert the volume adjusting instruction into one or more target data items according to the aforementioned operation 502 of FIG. 5 performed by the audio broadcasting device 150.

For example, in some embodiments where the aforementioned target data items are various Bluetooth advertising packets, the processing circuit 1065 may insert the aforementioned volume adjusting instruction into a single or multiple specific fields of a single Bluetooth advertising packet. Alternatively, the processing circuit 1065 may insert the aforementioned volume adjusting instruction into specific fields of multiple Bluetooth advertising packets.

For another example, in some embodiments where the aforementioned target data items are various BIS PDUs or BIG PDUs, the processing circuit 1065 may insert the aforementioned volume adjusting instruction into a single or multiple specific fields of a single BIS PDU or a single or multiple specific fields of a single BIG PDU, or may alternatively insert the above volume adjusting instruction into specific fields of multiple BIS PDUs or multiple BIG PDUs. As described previously, the aforementioned specific fields may be Event Counter fields, Sub-Event Counter fields, Payload Counter fields, or the like in the BIS PDUs or the BIG PDUs.

Then, the processing circuit 1065 may control the communication circuit 1061 to operate in a target transmitting mode according to the aforementioned operation 504 of FIG. 5 performed by the audio broadcasting device 150, so as to transmit the aforementioned one or more target data items to the first Bluetooth member device 110 and the second Bluetooth member device 120. The approach adopted by the communication circuit 1061 for transmitting the aforementioned one or more target data items to the first Bluetooth member device 110 and the second Bluetooth member device 120 under the target transmitting mode are similar to the aforementioned operation 504 and operation 506 of FIG. 5. For the sake of brevity, the descriptions will not be repeated here.

In practical applications, the host device 1060 may utilize the volume adjusting instruction to synchronously adjust the audio volume of other Bluetooth member devices in the Bluetooth audio broadcasting system 400 (e.g., the aforementioned third Bluetooth member device 130 and fourth Bluetooth member device 140) according to the aforementioned approaches of adjusting the audio volume of the first Bluetooth member device 110 or the second Bluetooth member device 120. This is merely an exemplary embodiment, rather than a restriction to the practical implementations of the present disclosure.

In practice, the audio volume of other Bluetooth member devices in the Bluetooth audio broadcasting system 400 (e.g., the aforementioned third Bluetooth member device 130 and fourth Bluetooth member device 140) may instead be controlled by another host device (e.g., the host device 1070). In this situation, the third Bluetooth member device 130 and the fourth Bluetooth member device 140 synchronously adjust their audio volume when playbacking the predetermined audio data according to the volume adjusting instruction generated by the host device 1070.

Figure 12:
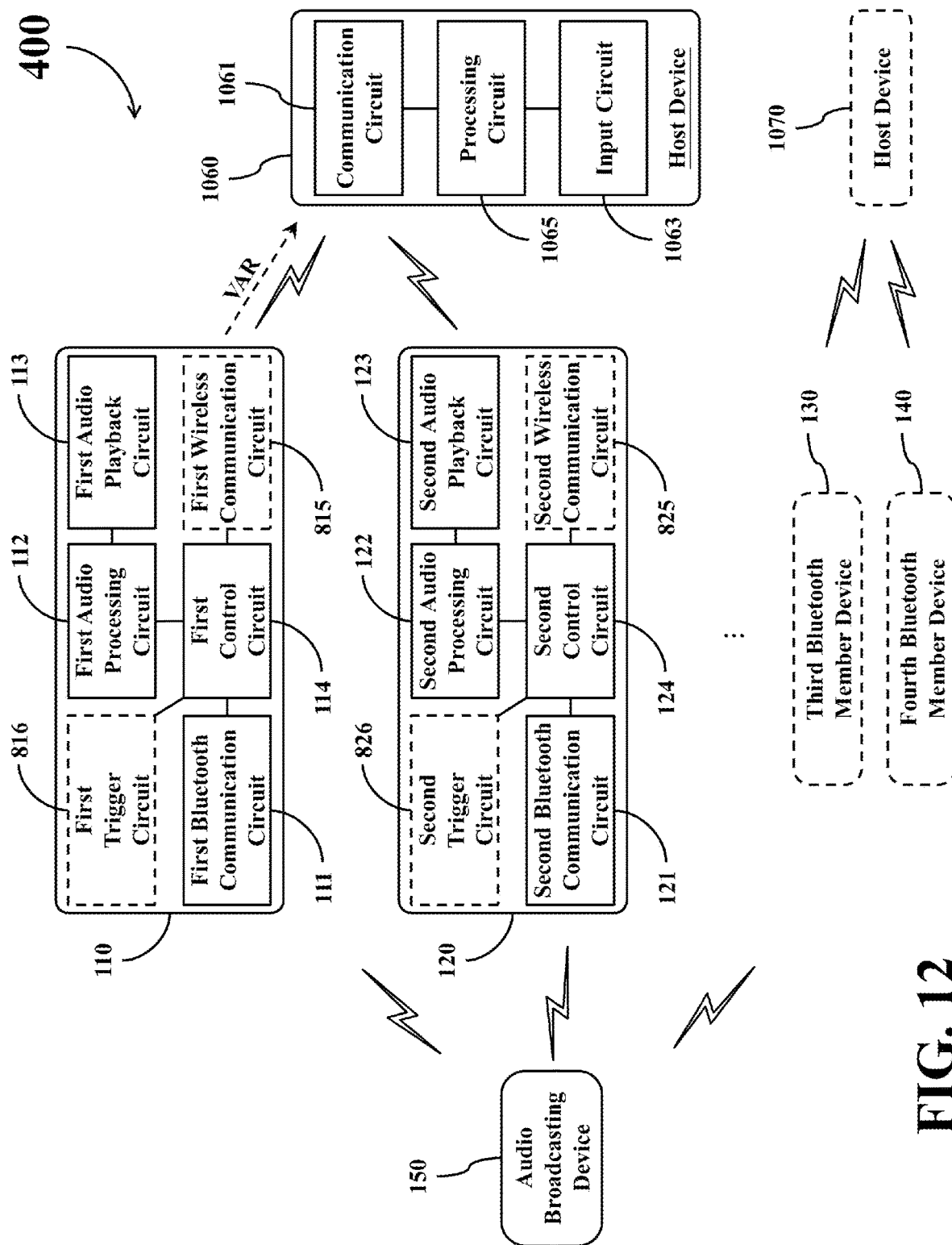
FIG. 12 shows a simplified functional block diagram of a Bluetooth audio broadcasting system according to an eighth embodiment of the present disclosure.

Please refer to FIG. 12, which shows a simplified functional block diagram of a Bluetooth audio broadcasting system 400 according to an eighth embodiment of the present disclosure. Similar to the Bluetooth audio broadcasting system 400 of FIG. 10, the Bluetooth audio broadcasting system 400 of FIG. 12 comprises the audio broadcasting device 150, multiple Bluetooth member devices (e.g., the aforementioned first Bluetooth member device 110, second Bluetooth member device 120, third Bluetooth member device 130, and fourth Bluetooth member device 140), the host device 1060, and the host device 1070.

In comparison with the aforementioned embodiment of FIG. 10, a part of or all of the Bluetooth member devices in the Bluetooth audio broadcasting system 400 of FIG. 12 further comprise a trigger circuit. For example, in the embodiment of FIG. 12, the first Bluetooth member device 110 further comprises the first trigger circuit 816 in addition to the aforementioned first Bluetooth communication circuit 111, first audio processing circuit 112, first audio playback circuit 113, first control circuit 114, and first wireless communication circuit 815. Similarly, the second Bluetooth member device 120 further comprises the second trigger circuit 826 in addition to the aforementioned second Bluetooth communication circuit 121, second audio processing circuit 122, second audio playback circuit 123, second control circuit 124, and second wireless communication circuit 825.

In the first Bluetooth member device 110, the first trigger circuit 816 is coupled with the first control circuit 114 and arranged to operably generate a corresponding user trigger signal according to the user's simple manipulation. The first control circuit 114 may generate a volume adjustment request VAR when the first trigger circuit 816 generates the user trigger signal and may utilize the first wireless communication circuit 815 to transmit the volume adjustment request VAR to the host device 1060.

In the second Bluetooth member device 120, the second trigger circuit 826 is coupled with the second control circuit 124 and arranged to operably generate a corresponding user trigger signal according to the user's simple manipulation. The second control circuit 124 may generate a volume adjustment request VAR when the second trigger circuit 826 generates the user trigger signal and may utilize the second wireless communication circuit 825 to transmit the volume adjustment request VAR to the host device 1060.

As described previously, the aforementioned first trigger circuit 816 and second trigger circuit 826 may be realized with various devices capable of generating a corresponding user trigger signal according to the user's simple manipulation. For example, the aforementioned first trigger circuit 816 and second trigger circuit 826 may be realized with various touch control circuits, buttons, switches, remote controls, touch screens, voice activated devices, gesture sensing devices, gyroscopes, circuits adopting other trigger signal generating technologies, or a combination of the above various devices. The first trigger circuit 816 may be configured outside of the first Bluetooth member device 110, or may be integrated with other functional blocks of the first Bluetooth member device 110. Similarly, the second trigger circuit 826 may be configured outside of the second Bluetooth member device 120, or may be integrated with other functional blocks of the second Bluetooth member device 120.

Other Bluetooth member devices in the Bluetooth audio broadcasting system 400 of FIG. 12 may be provided with corresponding trigger circuit according to the aforementioned structure of the first Bluetooth member device 110 or second Bluetooth member device 120.

Figure 13:
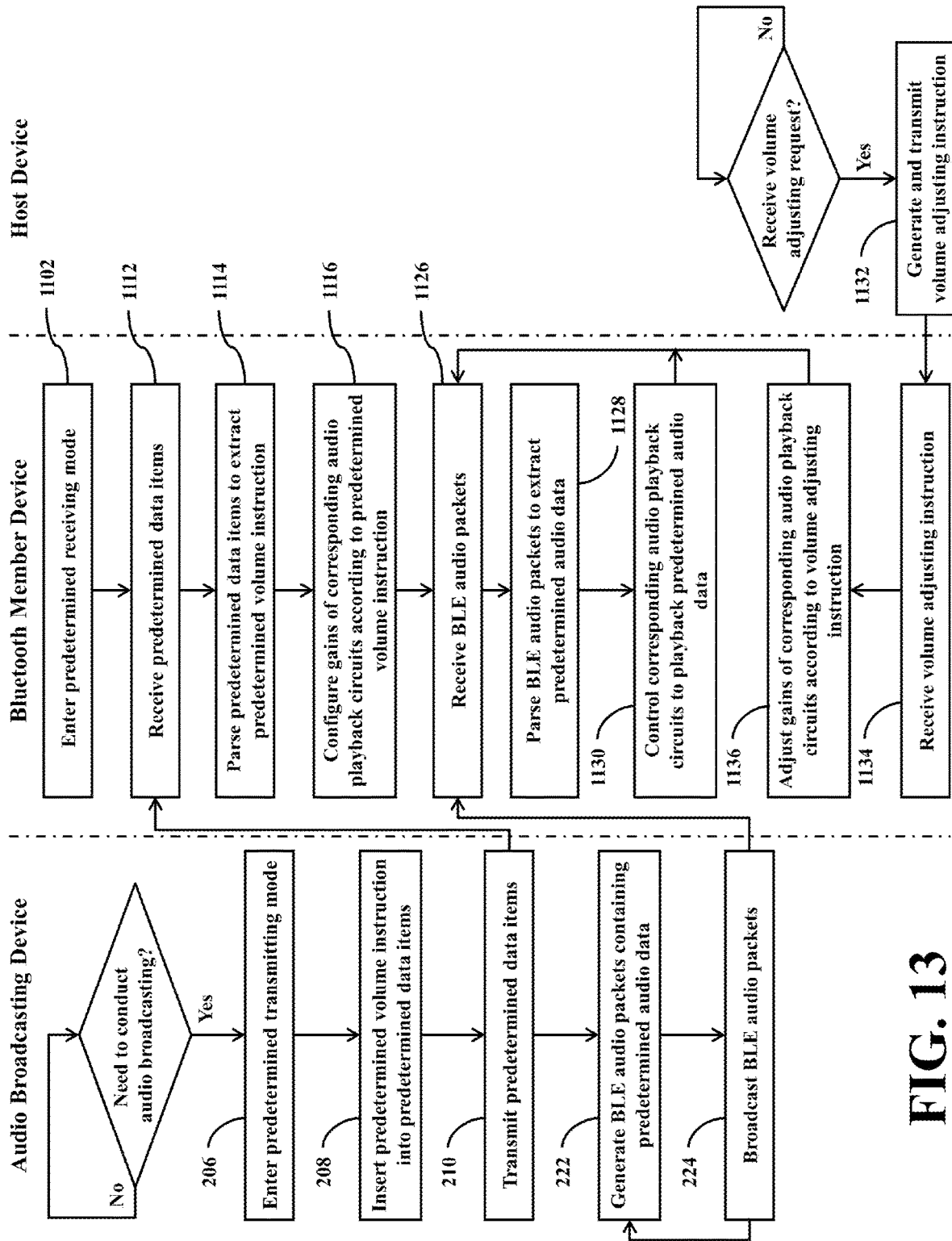
FIG. 13 shows a simplified flowchart of a method for conducting audio broadcasting by utilizing the BLE Audio technology according to a fourth embodiment of the present disclosure.

The operations of the Bluetooth audio broadcasting system 400 of FIG. 12 will be further described below by reference to FIG. 13. FIG. 13 shows a simplified flowchart of a method for conducting audio broadcasting by utilizing the BLE Audio technology according to a fourth embodiment of the present disclosure.

In general, respective operations of FIG. 13 are identical to the corresponding operations of the aforementioned embodiment of FIG. 11. Therefore, the Bluetooth audio broadcasting system 400 of FIG. 12 may conduct the audio broadcasting to multiple Bluetooth member devices according to the aforementioned approach of the Bluetooth audio broadcasting system 400 of FIG. 10.

However, during the period at which the audio broadcasting device 150 conducts the audio broadcasting (i.e., during the period at which the audio broadcasting device 150 repeatedly performs the operation 222 and the operation 224 of FIG. 13), if the user of the aforementioned multi-member Bluetooth device wants to adjust the audio volume of related Bluetooth member devices, the user may conduct a specific manipulation to the first trigger circuit 816 of the first Bluetooth member device 110, so as to render the first trigger circuit 816 to generate a user trigger signal and transmit the user trigger signal to the first control circuit 114. Alternatively, the user may conduct the specific manipulation to the second trigger circuit 826 of the second Bluetooth member device 120, so as to render the second trigger circuit 826 to generate a user trigger signal and transmit the user trigger signal to the second control circuit 124.

If the user conducts the specific manipulation to the first trigger circuit 816, then the first control circuit 114 may generate a volume adjustment request VAR according to the user trigger signal generated by the first trigger circuit 816 and may utilize the first wireless communication circuit 815 to transmit the volume adjustment request VAR to the communication circuit 1061 of the host device 1060. Similarly, if the user conducts the specific manipulation to the second trigger circuit 826, then the second control circuit 124 may generate a volume adjustment request VAR according to the user trigger signal generated by the second trigger circuit 826 and may utilize the second wireless communication circuit 825 to transmit the volume adjustment request VAR to the communication circuit 1061 of the host device 1060.

The difference between the aforementioned embodiment of FIG. 11 and the embodiment of FIG. 13 is that in the embodiment of FIG. 13, the processing circuit 1065 of the host device 1060 performs the operation 1132 of FIG. 13 when the communication circuit 1061 receives the volume adjustment request VAR transmitted from the first Bluetooth member device 110 or the second Bluetooth member device 120.

In the operation 1132, the processing circuit 1065 may generate a volume adjusting instruction for instructing a volume adjusting direction (e.g., turning up or turning down) according to the volume adjustment request VAR transmitted from the first Bluetooth member device 110 or the second Bluetooth member device 120, and may utilize the communication circuit 1061 to transmit the volume adjusting instruction to the first wireless communication circuit 815 of the first Bluetooth member device 110 and the second wireless communication circuit 825 of the second Bluetooth member device 120 by adopting various Radio Access technologies (RAT) except for the Bluetooth communication approach, so as to instruct the first Bluetooth member device 110 and the second Bluetooth member device 120 to synchronously adjust their audio volume.

In this situation, the first Bluetooth member device 110 and the second Bluetooth member device 120 of FIG. 12 may perform the aforementioned operation 1134 and operation 1136 to receive the volume adjusting instruction transmitted from the host device 1060 and adjust a gain of a corresponding audio playback circuit according to the volume adjusting instruction.

Since the first Bluetooth member device 110 and the second Bluetooth member device 120 adjust the audio volume according to the volume adjusting instruction transmitted from the host device 1060, when the first audio processing circuit 112 adjusts the audio volume of the first audio playback circuit 113, the second audio processing circuit 122 synchronously adjusts the audio volume of the second audio playback circuit 123.

In other words, the Bluetooth audio broadcasting system 400 of FIG. 12 permits the user to synchronously adjust the audio volume of related Bluetooth member devices in the Bluetooth audio broadcasting system 400.

Similar to the aforementioned embodiment of FIG. 10, the communication circuit 1061 of the host device 1060 of FIG. 12 may instead utilize the Bluetooth communication technology to transmit the volume adjusting instruction, so as to transmit the volume adjusting instruction to the first Bluetooth communication circuit 111 of the first Bluetooth member device 110 and the second Bluetooth communication circuit 121 of the second Bluetooth member device 120.

In this situation, the first Bluetooth member device 110 may utilize the first Bluetooth communication circuit 111 to receive the volume adjusting instruction transmitted from the host device 1060, and the second Bluetooth member device 120 may utilize the second Bluetooth communication circuit 121 to receive the volume adjusting instruction transmitted from the host device 1060. As a result, the first wireless communication circuit 815 and/or the second wireless communication circuit 825 of FIG. 12 may be omitted.

Additionally, in some embodiments, the second trigger circuit 826 of the second Bluetooth member device 120 of FIG. 8 may be omitted.

In some embodiments where the communication circuit 1061 of the host device 1060 utilizes the Bluetooth communication technology to transmit the volume adjusting instruction to the first Bluetooth member device 110 and the second Bluetooth member device 120, the processing circuit 1065 of the host device 1060 may insert the volume adjusting instruction into one or more target data items according to the aforementioned operation 502 of FIG. 5 performed by the audio broadcasting device 150. In addition, the processing circuit 1065 may control the communication circuit 1061 to operate in a target transmitting mode according to the aforementioned operation 504 of FIG. 5 performed by the audio broadcasting device 150, so as to transmit the aforementioned one or more target data items to the first Bluetooth member device 110 and the second Bluetooth member device 120. The approach adopted by the communication circuit 1061 for transmitting the aforementioned one or more target data items to the first Bluetooth member device 110 and the second Bluetooth member device 120 under the target transmitting mode are similar to the aforementioned operation 504 and operation 506 of FIG. 5. For the sake of brevity, the descriptions will not be repeated here.

In practical applications, the host device 1060 of FIG. 12 may utilize the volume adjusting instruction to synchronously adjust the audio volume of other Bluetooth member devices in the Bluetooth audio broadcasting system 400 (e.g., the aforementioned third Bluetooth member device 130 and fourth Bluetooth member device 140) according to the aforementioned approaches of adjusting the audio volume of the first Bluetooth member device 110 or the second Bluetooth member device 120. This is merely an exemplary embodiment, rather than a restriction to the practical implementations of the present disclosure.

In practice, the audio volume of other Bluetooth member devices in the Bluetooth audio broadcasting system 400 (e.g., the aforementioned third Bluetooth member device 130 and fourth Bluetooth member device 140) may instead be controlled by another host device (e.g., the host device 1070). In this situation, the third Bluetooth member device 130 and the fourth Bluetooth member device 140 synchronously adjust their audio volume when playbacking the predetermined audio data according to the volume adjusting instruction generated by the host device 1070.

The foregoing descriptions and connections regarding the related circuits and devices of FIG. 10 are also applicable to the Bluetooth audio broadcasting system 400 of FIG. 12. In addition, since respective operations of FIG. 13 are basically the same as the corresponding operations of the aforementioned embodiment of FIG. 11, the foregoing descriptions regarding the operations of FIG. 11 are also applicable to the embodiment of FIG. 13. For the sake of brevity, the descriptions will not be repeated here.

As can be appreciated from the foregoing descriptions of FIG. 10 through FIG. 13, before the multi-member Bluetooth device in the Bluetooth audio broadcasting system 400 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 400 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, when beginning to synchronously playback the predetermined audio data, the audio volume of other Bluetooth member devices in the Bluetooth audio broadcasting system 400 can make the user feel comfortable and will not cause discomfort or displeasure to the user.

In addition, the user may conduct a manipulation to the host device 1060 during the period at which the multi-member Bluetooth device in the Bluetooth audio broadcasting system 400 playbacks the audio data broadcasted by the audio broadcasting device 150, so as to render the host device 1060 to transmit a volume adjusting instruction to respective Bluetooth member devices (e.g., the aforementioned first 110 and second Bluetooth member device 120) to synchronously adjust the audio volume of the related Bluetooth member devices. In other words, the aforementioned Bluetooth audio broadcasting system 400 permits the user to synchronously adjust the audio volume of different Bluetooth member devices in the Bluetooth audio broadcasting system 400.

Moreover, the Bluetooth audio broadcasting system 400 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 400 not only reduces the power consumption of the multi-member Bluetooth device to thereby extend the serving time of the multi-member Bluetooth device, but also effectively improves the overall audio quality of audio broadcasting.

Please note that the aforementioned executing order of the operations in each flowchart is merely an exemplary embodiment, rather than a restriction to the practical implementations of the present disclosure.

For example, the operation 206 of FIG. 2 and/or FIG. 4 may be performed before the operation 202 and/or operation 204, or may be performed at the same time with the operation 202 or operation 204.

For another example, the operation 206 of FIG. 11 and/or FIG. 13 may be performed before the operation 1102, or may be performed at the same time with the operation 1102.

For yet another example, the operation 222 of FIG. 2, FIG. 4, FIG. 11, and/or FIG. 13 may be performed before the operation 208 and/or the operation 210, or may be performed at the same time with the operation 208 or the operation 210.

For yet another example, in some embodiments, the operation 208 through the operation 220 of FIG. 4 may be omitted.

For yet another example, in some embodiments, the operation 208, the operation 210, the operation 1112, the operation 1114, and the operation 1116 of FIG. 11 and FIG. 13 may be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A Bluetooth audio broadcasting system (300), comprising:
- an audio broadcasting device (150), arranged to operably broadcast one or more Bluetooth LE (BLE) audio packets through a Broadcast Isochronous Stream (BIS) logical transport;
- a first Bluetooth member device (110), comprising:
  - a first Bluetooth communication circuit (111), arranged to operably receive the one or more BLE audio packets;
  - a first audio processing circuit (112); and
  - a first control circuit (114), coupled with the first Bluetooth communication circuit (111) and the first audio processing circuit (112), and arranged to operably parse the one or more BLE audio packets received by the first Bluetooth communication circuit (111) to acquire a predetermined audio data, and to operably instruct the first audio processing circuit (112) to control a first audio playback circuit (113) to playback the predetermined audio data;
- a second Bluetooth member device (120), comprising:
  - a second Bluetooth communication circuit (121), arranged to operably receive the one or more BLE audio packets;
  - a second audio processing circuit (122); and
  - a second control circuit (124), coupled with the second Bluetooth communication circuit (121) and the second audio processing circuit (122), and arranged to operably parse the one or more BLE audio packets received by the second Bluetooth communication circuit (121) to acquire the predetermined audio data, and to operably instruct the second audio processing circuit (122) to control a second audio playback circuit (123) to playback the predetermined audio data;
- wherein the audio broadcasting device (150) transmits a volume adjusting instruction to the first Bluetooth member device (110) and the second Bluetooth member device (120) after a volume adjustment request (VAR) is issued from the first Bluetooth member device (110);
- wherein the first Bluetooth communication circuit (111) is further arranged to operably receive the volume adjusting instruction, and the first control circuit (114) is further arranged to operably control the first audio processing circuit (112) to adjust an audio volume of the first audio playback circuit (113) according to the volume adjusting instruction;
- wherein the second Bluetooth communication circuit (121) is further arranged to operably receive the volume adjusting instruction, and the second control circuit (124) is further arranged to operably control the second audio processing circuit (122) to adjust an audio volume of the second audio playback circuit (123) according to the volume adjusting instruction;
- wherein the audio broadcasting device (150) is further arranged to operably insert the volume adjusting instruction into one or more target data items, and to operably transmit the one or more target data items;
- wherein the first Bluetooth communication circuit (111) is further arranged to operably receive the one or more target data items, and the first control circuit (114) is further arranged to operably parse the one or more target data items to acquire the volume adjusting instruction, and to operably control the first audio processing circuit (112) to adjust a gain of the first audio playback circuit (113) according to the volume adjusting instruction;
- wherein the second Bluetooth communication circuit (121) is further arranged to operably receive the one or more target data items, and the second control circuit (124) is further arranged to operably parse the one or more target data items to acquire the volume adjusting instruction, and to operably control the second audio processing circuit (122) to adjust a gain of the second audio playback circuit (123) according to the volume adjusting instruction.

2. The Bluetooth audio broadcasting system (300) of claim 1, wherein the first Bluetooth member device (110) further comprises:
- a first trigger circuit (816), coupled with the first control circuit (114), and arranged to operably generate a user trigger signal according to a user's manipulation;
- wherein the first control circuit (114) is further arranged to operably generate the volume adjustment request (VAR) according to the user trigger signal.

3. The Bluetooth audio broadcasting system (300) of claim 1, wherein the one or more target data items are selected from a group consisting of following items:
- one or more advertising indication (ADV_IND) packets;
- one or more non-connectable advertising indication (ADV_NONCONN_IND) packets;
- one or more discoverable advertisement indication (ADV_DISCOVER_IND) packets;
- one or more auxiliary advertising indication (AUX_ADV_IND) packets;
- one or more extended advertising indication (ADV_EXT_IND) packets;
- one or more auxiliary chain indication (AUX_CHAIN_IND) packets;
- one or more auxiliary scan response (AUX_SCAN_RSP) packets;
- one or more auxiliary synchronous indication (AUX_SYNC_IND) packets;
- one or more Broadcast Isochronous Stream (BIS) protocol data units; and
- one or more Broadcast Isochronous Group (BIG) protocol data units.

4. The Bluetooth audio broadcasting system (300) of claim 2, further comprising:
- a host device (660), coupled with the audio broadcasting device (150), and arranged to operably receive the volume adjustment request (VAR), and to operably generate a volume adjusting signal (VAS) according to the volume adjustment request (VAR) and to operably transmit the volume adjusting signal (VAS) to the audio broadcasting device (150);
- wherein the audio broadcasting device (150) transmits the volume adjusting instruction to the first Bluetooth member device (110) and the second Bluetooth member device (120) when receiving the volume adjusting signal (VAS).

5. A multi-member Bluetooth device, comprising:
- a first Bluetooth member device (110), comprising:
  - a first Bluetooth communication circuit (111), arranged to operably receive one or more BLE audio packets broadcasted by an audio broadcasting device (150) through a Broadcast Isochronous Stream (BIS) logical transport;
  - a first audio processing circuit (112); and
  - a first control circuit (114), coupled with the first Bluetooth communication circuit (111) and the first audio processing circuit (112), and arranged to operably parse the one or more BLE audio packets received by the first Bluetooth communication circuit (111) to acquire a predetermined audio data, and to operably instruct the first audio processing circuit (112) to control a first audio playback circuit (113) to playback the predetermined audio data; and a second Bluetooth member device (120), comprising:
- a second Bluetooth communication circuit (121), arranged to operably receive the one or more BLE audio packets broadcasted by the audio broadcasting device (150) through the BIS logical transport;
- a second audio processing circuit (122); and
- a second control circuit (124), coupled with the second Bluetooth communication circuit (121) and the second audio processing circuit (122), and arranged to operably parse the one or more BLE audio packets received by the second Bluetooth communication circuit (121) to acquire the predetermined audio data, and to operably instruct the second audio processing circuit (122) to control a second audio playback circuit (123) to playback the predetermined audio data;

wherein the audio broadcasting device (150) transmits a volume adjusting instruction to the first Bluetooth member device (110) and the second Bluetooth member device (120) after a volume adjustment request (VAR) is issued from the first Bluetooth member device (110);

wherein the first Bluetooth communication circuit (111) is further arranged to operably receive the volume adjusting instruction, and the first control circuit (114) is further arranged to operably control the first audio processing circuit (112) to adjust an audio volume of the first audio playback circuit (113) according to the volume adjusting instruction;

wherein the second Bluetooth communication circuit (121) is further arranged to operably receive the volume adjusting instruction, and the second control circuit (124) is further arranged to operably control the second audio processing circuit (122) to adjust an audio volume of the second audio playback circuit (123) according to the volume adjusting instruction;

wherein the audio broadcasting device (150) is further arranged to operably insert the volume adjusting instruction into one or more target data items and to operably transmit the one or more target data items;

wherein the first Bluetooth communication circuit (111) is further arranged to operably receive the one or more target data items, and the first control circuit (114) is further arranged to operably parse the one or more target data items to acquire the volume adjusting instruction, and to operably control the first audio processing circuit (112) to adjust a gain of the first audio playback circuit (113) according to the volume adjusting instruction;

wherein the second Bluetooth communication circuit (121) is further arranged to operably receive the one or more target data items, and the second control circuit (124) is further arranged to operably parse the one or more target data items to acquire the volume adjusting instruction, and to operably control the second audio processing circuit (122) to adjust a gain of the second audio playback circuit (123) according to the volume adjusting instruction.

6. The multi-member Bluetooth device of claim 5, wherein the first Bluetooth member device (110) further comprises:
- a first trigger circuit (816), coupled with the first control circuit (114), and arranged to operably generate a user trigger signal according to a user's manipulation;
- wherein the first control circuit (114) is further arranged to operably generate the volume adjustment request (VAR) according to the user trigger signal.

7. The multi-member Bluetooth device of claim 5, wherein the one or more target data items are selected from a group consisting of following items:
- one or more advertising indication (ADV_IND) packets;
- one or more non-connectable advertising indication (ADV_NONCONN_IND) packets;
- one or more discoverable advertisement indication (ADV_DISCOVER_IND) packets;
- one or more auxiliary advertising indication (AUX_ADV_IND) packets;
- one or more extended advertising indication (ADV_EXT_IND) packets;
- one or more auxiliary chain indication (AUX_CHAIN_IND) packets;
- one or more auxiliary scan response (AUX_SCAN_RSP) packets;
- one or more auxiliary synchronous indication (AUX_SYNC_IND) packets;
- one or more Broadcast Isochronous Stream (BIS) protocol data units; and
- one or more Broadcast isochronous Group (BIG) protocol data units.

8. A multi-member Bluetooth device, comprising:
a first Bluetooth member device (110), comprising:
- a first Bluetooth communication circuit (111), arranged to operably receive one or more BLE audio packets broadcasted by an audio broadcasting device (150) through a Broadcast Isochronous Stream (BIS) logical transport;
- a first audio processing circuit (112); and
- a first control circuit (114), coupled with the first Bluetooth communication circuit (111) and the first audio processing circuit (112), and arranged to operably parse the one or more BLE audio packets received by the first Bluetooth communication circuit (111) to acquire a predetermined audio data, and to operably instruct the first audio processing circuit (112) to control a first audio playback circuit (113) to playback the predetermined audio data; and a second Bluetooth member device (120), comprising:
- a second Bluetooth communication circuit (121), arranged to operably receive the one or more BLE audio packets broadcasted by the audio broadcasting device (150) through the BIS logical transport;
- a second audio processing circuit (122); and
- a second control circuit (124), coupled with the second Bluetooth communication circuit (121) and the second audio processing circuit (122), and arranged to operably parse the one or more BLE audio packets received by the second Bluetooth communication circuit (121) to acquire the predetermined audio data, and to operably instruct the second audio processing circuit (122) to control a second audio playback circuit (123) to playback the predetermined audio data;

wherein the audio broadcasting device (150) transmits a volume adjusting instruction to the first Bluetooth member device (110) and the second Bluetooth member device (120) after a volume adjustment request (VAR) is issued from the first Bluetooth member device (110);

wherein the first Bluetooth communication circuit (111) is further arranged to operably receive the volume adjusting instruction, and the first control circuit (114) is further arranged to operably control the first audio processing circuit (112) to adjust an audio volume of the first audio playback circuit (113) according to the volume adjusting instruction;

wherein the second Bluetooth communication circuit (121) is further arranged to operably receive the volume adjusting instruction, and the second control circuit (124) is further arranged to operably control the second audio processing circuit (122) to adjust an audio volume of the second audio playback circuit (123) according to the volume adjusting instruction;

wherein the audio broadcasting device (150) transmits a predetermined audio volume instruction to the first Bluetooth member device (110) and the second Bluetooth member device (120) before broadcasting the one or more BLE audio packets;

wherein the first Bluetooth communication circuit (111) is further arranged to operably receive the predetermined audio volume instruction, and the first control circuit (114) is further arranged to operably control the first audio processing circuit (112) to configure the audio volume of the first audio playback circuit (113) in advance according to the predetermined audio volume instruction;

wherein the second Bluetooth communication circuit (121) is further arranged to operably, receive the predetermined audio volume instruction, and the second control circuit (124) is further arranged to operably control the second audio processing circuit (122) to configure the audio volume of the second audio playback circuit (123) in advance according to the predetermined audio volume instruction.

* * * * *